United States Patent [19]

Kato

[11] Patent Number: 5,675,714
[45] Date of Patent: Oct. 7, 1997

[54] MODE IDENTIFYING METHOD AND OUTPUT APPARATUS USING SUCH A METHOD

[75] Inventor: Yuzo Kato, Yokohama, Japan

[73] Assignee: Canon Kabushiki Kaisha, Tokyo, Japan

[21] Appl. No.: 484,915

[22] Filed: Jun. 7, 1995

Related U.S. Application Data

[63] Continuation of Ser. No. 38,704, Mar. 29, 1993, abandoned.

[30] Foreign Application Priority Data

Mar. 30, 1992 [JP] Japan .................................. 4-074775
Jun. 30, 1992 [JP] Japan .................................. 4-173501

[51] Int. Cl.$^6$ .................................................. G06F 17/00
[52] U.S. Cl. .................................................. 395/51
[58] Field of Search ........................... 395/51, 3, 900, 395/250, 200.01, 200.06, 200.02, 849

[56] References Cited

U.S. PATENT DOCUMENTS 4,542,411  9/1985  Imanaka et al. ............ 358/260
4,872,763  10/1989  Higuchi et al. ............ 395/900
5,142,283  8/1992  Chevion et al. ............ 395/900

OTHER PUBLICATIONS

Fant Tree Based Diagnostics Using Fuzzy Logic P. Gmytrasiewicz et al IEEE/Nov. 11, 1990.

A Multiplier Chip with Multiple-Value Bidirectional Current Mode Logic Circuits M. Kameyama et al. IEEE/Apr. 30, 1988.

Primary Examiner—Allen R. MacDonald
Assistant Examiner—Richemond Dorvil
Attorney, Agent, or Firm—Fitzpatrick, Cella, Harper & Scinto

[57] ABSTRACT

A mode identifying method of identifying a mode to which inputted code data belongs is provided. An inherent code existing in each mode so as to have a probability-manner relation and the probability-manner relation are stored so as to correspond to each other. A code which coincides with the inherent code stored is extracted from the code data and the number of coincidence times of every code is counted. The mode to which the code data belongs is identified on the basis of the number of coincidence times obtained by the counting step and the probability-manner relation stored by applying a multi-value logical relation or a fuzzy logical relation or both of a fuzzy rule and a fuzzy inference to the number of coincidence times obtained and probability-manner relation stored.

15 Claims, 21 Drawing Sheets

NB : NEGATIVE BIG
NS : NEGATIVE SMALL
Z  : ZERO
PS : POSITIVE SMALL
PB : POSITIVE BIG

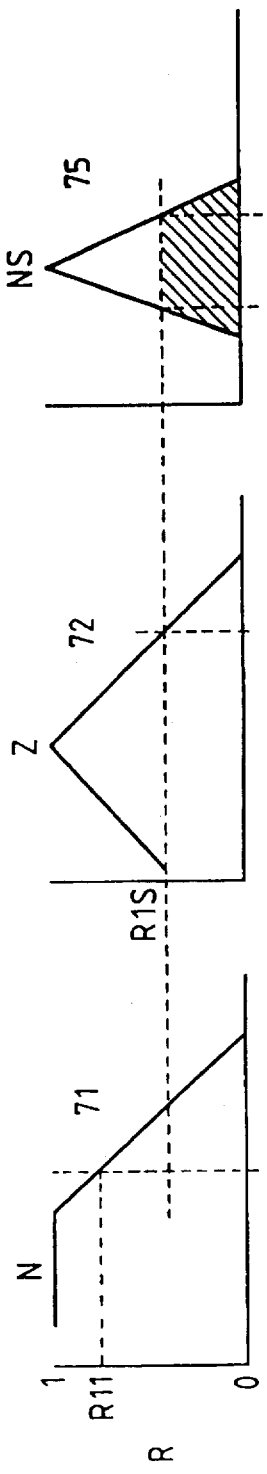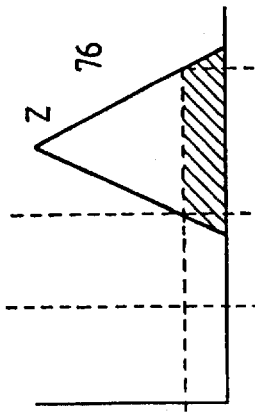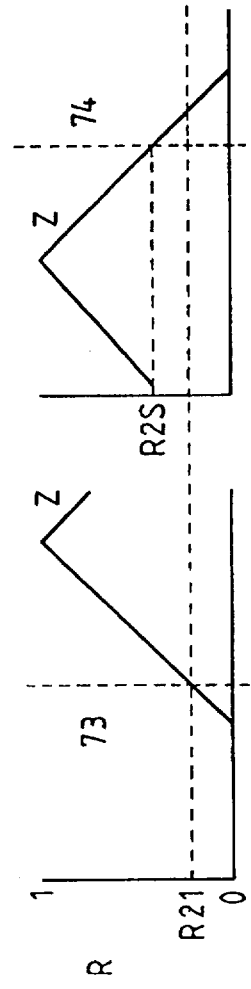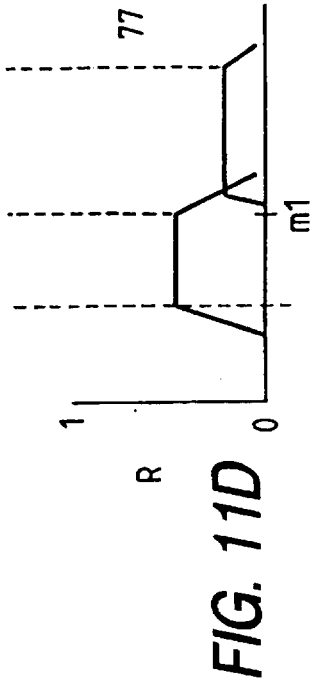
FIG. 11A1  FIG. 11B1  FIG. 11C1
FIG. 11A2  FIG. 11B2  FIG. 11C2
FIG. 11D

FIG. 12

| CODE | CODE SEQUENCE | MODE A | MODE B | MODE C | |
|---|---|---|---|---|---|
| 10 | 14 | 0.8 | — | — | ----- |
| ---- | ----- | — | 0.7 | — | ----- |
| ---- | ----- | 0.45 | 0.2 | ----- | ----- |
| ---- | ----- | — | 0.3 | 0.4 | ----- |
| ---- | ----- | ----- | ----- | ----- | ----- |

Columns labeled: 120 (CODE), (CODE SEQUENCE), 121 (MODE A), 122 (MODE B), (MODE C)

Rows labeled 123 (LOGICAL RELATION): INHERENT IN 1 MODE; INHERENT IN A SMALL NUMBER OF MODES

|  |  | COINCIDENCE DEGREE (MODE 1) | | |
|---|---|---|---|---|
|  |  | N | Z | P |
| COINCIDENCE DEGREES (OTHER MODES) | N | Z | PS | PB |
|  | Z | NB | Z | PS |
|  | P | NB | NS | Z |

NB : NEGATIVE BIG
NS : NEGATIVE SMALL
Z  : ZERO
PS : POSITIVE SMALL
PB : POSITIVE BIG

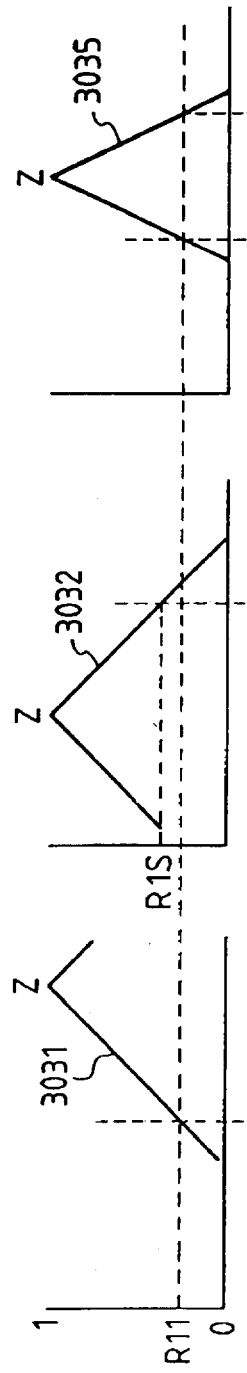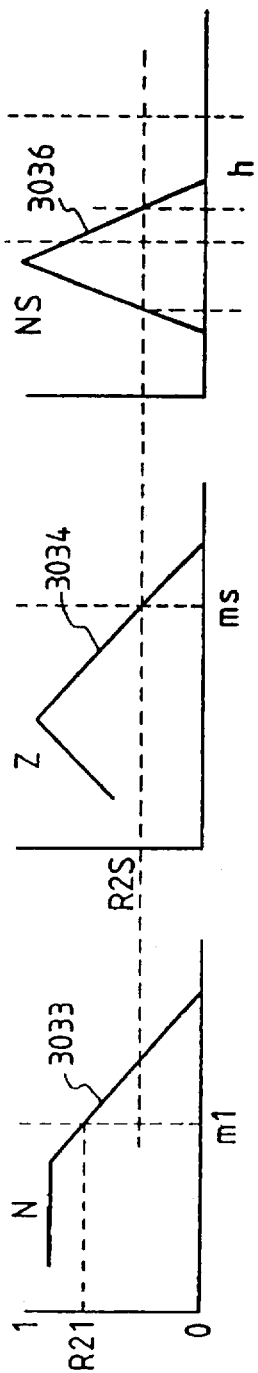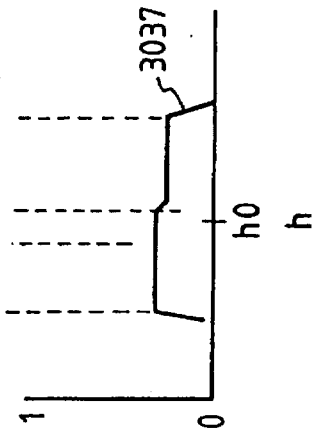

MODE IDENTIFYING METHOD AND OUTPUT APPARATUS USING SUCH A METHOD

This application is a continuation of application Ser. No. 08/038,704 filed Mar. 29, 1993, abandoned.

BACKGROUND OF THE INVENTION

1. Field of the Invention

The present invention relates to a mode identifying method of a code data whereby code data such as control code, character code, and the like is received from an external apparatus and a mode to which the code data belongs is identified and also relates to an output apparatus having such a code data mode identifying method.

2. Related Background Art

Computer peripheral apparatuses execute communication/control of code data comprising a code sequence or a code sequence group between the apparatuses. For instance, between a host computer and a printer, the printer is controlled by a control code and a character code sent from the host computer, thereby forming a print image.

In recent years, in association with the widespread use of the host computer and printer, many kinds of control codes and character codes (hereinafter, referred to as modes) have been developed. A printer which can cope with a plurality of modes has been developed in order to enable the printing to be executed even in the case where the host computer and printer of different modes are connected. To enable the printer which can cope with a plurality of modes to be more easily used, further, there occurs a requirement of a printer which has a function to identify the mode from the received data and to automatically execute the switching of the modes.

A pattern recognizing technique is used to identify the mode of the received data. Generally, the apparatus using the pattern recognition has an advantage such that a human operation can be omitted by the automatization of the apparatus. However, there are disadvantages such that a recognition factor is low and it takes a long time for recognition. Even in a mode identifying process in the printer, a similar problem occurs because a pattern recognition is used. In other words, in case of automatically identifying the mode from the received data on the printer side, there is an advantage such that the operation to designate the mode on the host computer side can be omitted. However, when a recognition ratio is low, there is a disadvantage such that the printer doesn't accept the received data or an erroneous operation occurs. There is also a disadvantage such that as the time which is required for identification is long, the waiting time for printing also increases. As mentioned above, a subject to realize the automatic identification of the mode is to raise the recognition ratio and to reduce the time which is required for identification.

From the above viewpoints, for instance, there has been proposed a method of identifying the mode by using the following logical relations.

(1) A code sequence (for example, code sequence 1) existing for only one mode (for example, mode 1) is used and when the code sequence 1 exists in the received data, the result of identification is set to mode 1.

(2) A code sequence existing for only a small number of modes is used and the mode is identified in accordance with the logical relation between the code sequence and the mode. For instance, now assuming that the code sequence 12 exists for only modes 1 and 2 and the code sequence 13 exists for only modes 1 and 3, a logic "a mode in which both of the code sequences 12 and 13 exist is mode 1" is satisfied. By using such a logic, when the code sequences 12 and 13 exist in the received data, the result of identification is set to mode 1.

In case of using such logic relations, a high recognition ratio is obtained and the mode can be identified at a high speed when the following three conditions are satisfied.

Condition 1: The relevant code sequences exist for all of the modes.

Condition 2: The relevant code sequences certainly exist in the received data as a target.

Condition 3: The relevant code sequences can be accurately extracted from the data.

However, to satisfy the above conditions, the following points are necessary.

(1) The code sequences which take all of the modes into consideration are analyzed and the relevant code sequences are extracted.

(2) A probability such that the relevant code sequences exist in the received data is examined.

(3) A feature extracting process such that the processes of the relevant code sequences existing in the received data are not influenced by a noise or the like is developed.

However, in case of the code sequence data, such operations are difficult and there is no guarantee such that the above conditions are satisfied. There is a problem such that when the above conditions are not satisfied, an erroneous identification ratio according to the mode identifying method rises.

The above problems occur due to the following causes.

(1) The identification is executed on the basis of a very small amount of information such as relevant code sequences.

(2) The identification is executed on the basis of the strict logical relation which is satisfied between the relevant code sequences and the mode.

SUMMARY OF THE INVENTION

The present invention is made in consideration of the above problems and it is an object of the invention to provide a mode identifying method whereby when the identification of a mode is executed by a logical method by using a code which is used for each mode, by permitting a vague logical relation, the number of codes which can be used for identification is increased and an identification ratio is improved and to also provide an output apparatus using such a method.

A mode identifying method according to the present invention to accomplish the above object comprises the steps of: in order to identify a mode to which inputted code data belongs, storing the inherent code existing so as to have a probability-manner relation and such a probability-manner relation so as to correspond to each other; extracting the code which coincides with the stored inherent code from the code data; counting the number of coincidence times for every code; and identifying the mode to which the code data belongs on the basis of the number of coincidence times obtained and the probability-manner relation stored.

An output apparatus according to the present invention to accomplish the above object comprises: memory means for storing an inherent code existing so as to have a probability-manner relation for each mode and such a probability-manner relation so as to correspond to each other in order to identify a mode to which inputted code data belongs; counting means for extracting the code which coincides with the inherent code stored in the memory means from the code data and for counting the number of coincidence times for every code; and identifying means for identifying the mode to which the code data belongs on the basis of the number of coincidence times obtained by the counting means and the probability-manner relation stored in the memory means.

A mode identifying method according to the present invention to accomplish the above object comprises the steps of: in order to identify a mode to which inputted code data belongs, storing the inherent code for each mode as a feature code in correspondence to each mode; extracting the code for comparison with the feature code from the code data; comparing the feature code stored and the extracted code; and identifying the mode to which the feature code belongs as a mode of the code data in the case where the feature code coincides with the extracted code in the above comparing step.

An output apparatus according to the invention to accomplish the above object comprises: memory means for storing an inherent code for each mode as a feature code in correspondence to each mode in order to identify a mode to which inputted code data belongs; memory means in which the inherent code for each mode has been stored as a feature code in correspondence to each mode; extracting means for extracting the code for comparison with the feature code from the code data; and interpreting means for setting the mode to which the stored code belongs into a result of identification in the case where the feature code coincides with the extracted code and for interpreting the code data in accordance with the mode of the identification result.

BRIEF DESCRIPTION OF THE DRAWINGS

FIG. 11 includes FIGS. 11A1, 11A2, 11B1, 11B2, 11C1, 11C2, and 11D which are diagrams or explaining a mode identifying process according to the fuzzy inference;

FIG. 12 is a diagram for explaining a data construction of a code memory area;

FIG. 23 includes FIGS. 23A1, 23A2, 23B1, 23B2, 23C1, 23C2, and 23D which are diagrams for explaining a procedure to obtain an identification degree from the membership function and the coincidence degree;

DETAILED DESCRIPTION OF THE PREFERRED EMBODIMENTS

Preferred embodiments of the present invention will now be described hereinbelow with reference to the drawings.

The present invention can be applied to printers of any types such as laser beam printer, ink jet printer, and the like. The invention can be also applied to a display apparatus such as a CRT or the like.

A construction of a laser beam printer to which the embodiments are applied will be first explained with reference to FIG. 24.

Figure 24:
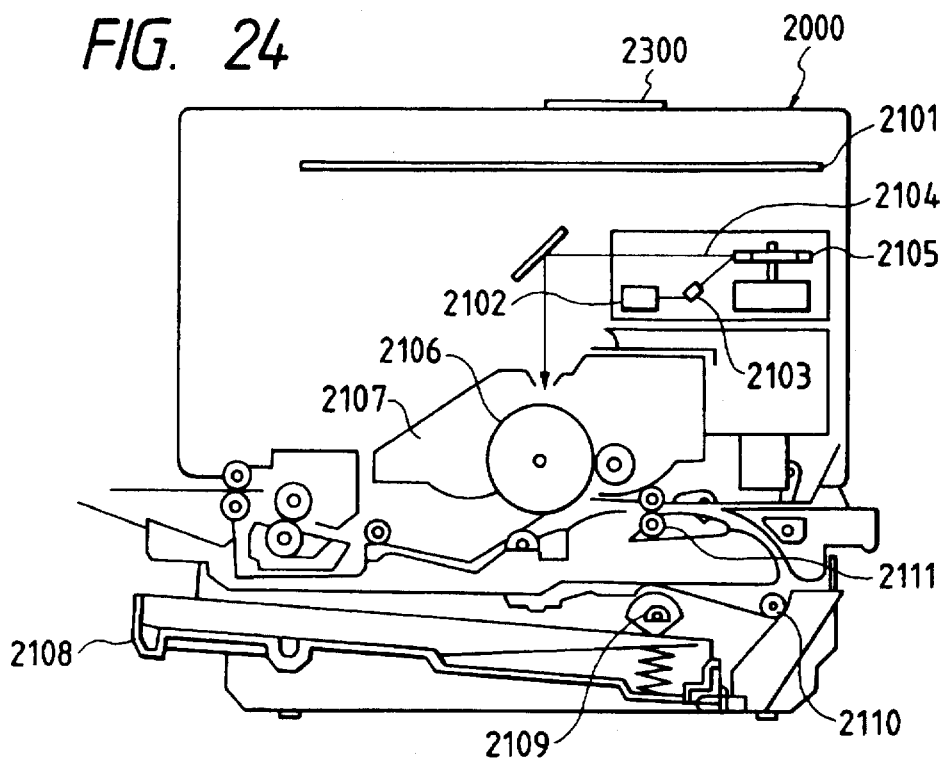
FIG. 24 is a side sectional view showing a construction of a laser beam printer which is applied to the embodiments.

FIG. 24 is a side sectional view showing an internal structure of the laser beam printer (hereinafter, abbreviated to LBP) of the embodiment. The LBP can register a character pattern, a fixed-size format (form data), and the like from a data source (not shown).

In FIG. 24, reference numeral 2000 denotes an LBP main body. The LBP main body 2000 receives print data (character code and the like), form data, macro instruction, or the like which is supplied from a host computer and stores them and also forms the corresponding character pattern, form pattern, or the like in accordance with those data, thereby forming an image onto a recording paper as a recording medium. Reference numeral 2300 denotes an operation panel in which switched for operations, an LED display, and the like are arranged. Reference numeral 2101 denotes a printer control unit for controlling the whole LBP 2000 and for analyzing character data or the like which is supplied from the host computer. The printer control unit 2101 mainly converts the character data into the video signal of the corresponding character pattern and supplies the signal to a laser driver 2102.

The laser driver 2102 is a circuit to drive a semiconductor laser 2103. In accordance with the inputted video signal, the laser driver on/off switches a laser beam 2104 which is emitted from the semiconductor laser 2103. The laser beam 2104 is swung to the right and left by a rotary polygon mirror 2105 and scans and exposes the surface on an electrostatic drum 2106. Due to this, an electrostatic latent image of a character pattern is formed on the drum 2106. The latent image is developed by a developing unit 2107 arranged around the drum 2106 and, after that, it is copy transferred onto a recording paper. A cut sheet is used as a recording paper. The cut sheet recording papers are enclosed in a paper cassette 2108 attached in the LBP 2000. The cut sheets are picked up one by one and conveyed by a feed roller 2109 and conveying rollers 2110 and 2111 into the apparatus. The recording paper is subsequently fed to the drum 2106.

The output apparatus to which the embodiment is applied is not limited to the laser beam printer but can be also applied to an ink jet printer, which will be explained hereinlater, or the like. The ink jet printer will now be described.

<Schematic explanation of the apparatus main body>

Figure 25:
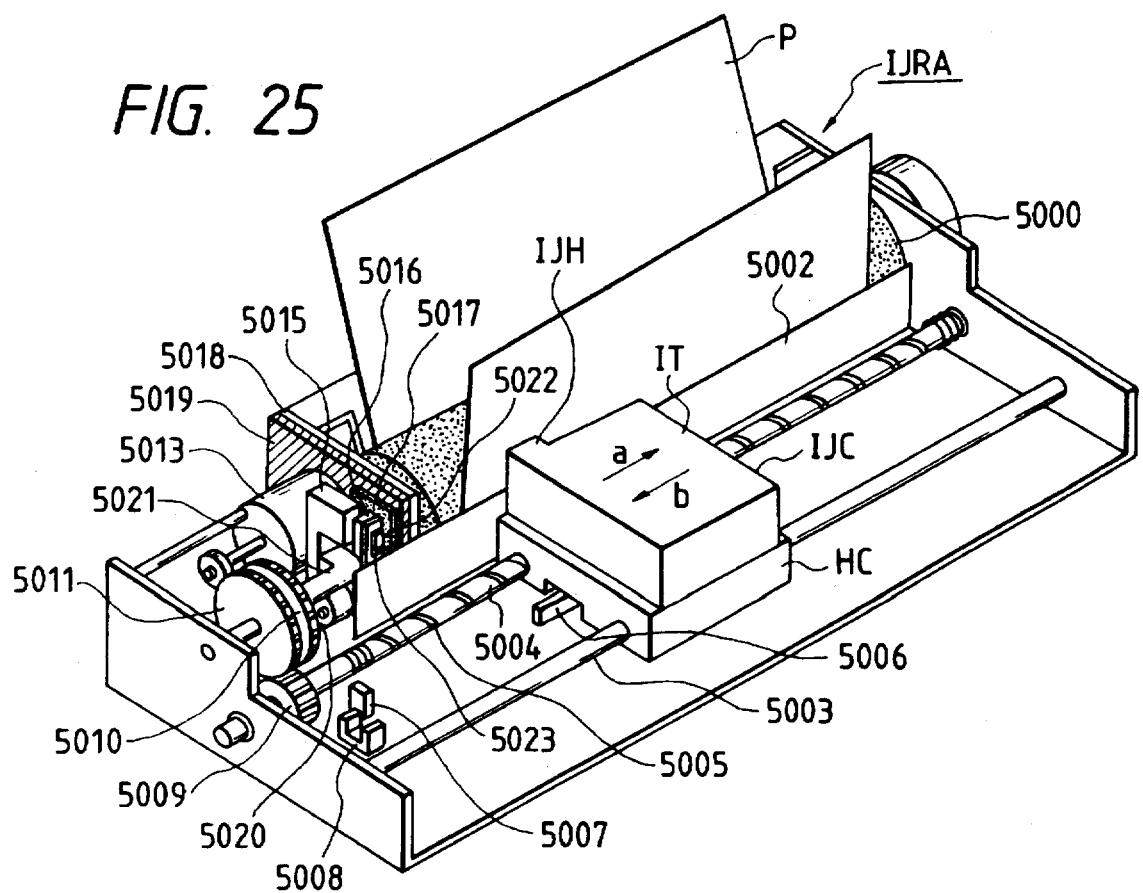
FIG. 25 is an external view of an ink jet printer which is applied to the embodiments.

FIG. 25 is a schematic diagram of an ink jet recording apparatus IJRA to which the present invention can be applied. In the diagram, a lead screw 5004 is rotated through driving force transfer gears 5011 and 5009 interlockingly with the forward/reverse rotation of a driving motor 5013. A carriage HC comes into engagement with a spiral groove 5005 of the lead screw 5004. The carriage HC has a pin (not shown) and is reciprocated in the directions indicated by arrows a and b. An ink jet cartridge IJC is mounted on the carriage HC. Reference numeral 5002 denotes a paper pressing plate to press the paper onto a platen 5000 along the moving direction of the carriage. Reference numeral 5007 and 5008 denote photocouplers serving as home position detecting means for confirming the existence of a lever 5006 of the carriage in the region of each photocoupler and for performing the switching of the rotating direction of the motor 5013 or the like. Reference numeral 5016 denotes a member to support a cap member 5022 to cap the front surface of a recording head; and 5015 indicates sucking means for sucking the air in the cap. The sucking means 5015 executes a sucking recovery of the recording head through an opening 5023 in the cap. Reference numeral 5017 denotes a cleaning blade and 5019 indicates a member to enable the cleaning blade 5017 to be moved in the front and back directions. The cleaning blade 5017 and the member 5019 are supported to a main body supporting plate 5018. The cleaning blade is not limited to the shape shown in the diagram but a well-known cleaning blade can be also obviously applied to the embodiment. Reference numeral 5012 denotes a lever to start the sucking operation of the sucking recovery. The lever 5012 moves in association with the movement of a cam 5020 which comes into engagement with a carriage. A driving force from the driving motor is transferred and controlled by well-known transfer means such as clutch switch or the like.

A desired one of the capping process, cleaning process, and sucking recovery process can be performed at its corresponding position by the operation of the lead screw 5005 when the carriage reaches the region on the home position side. By executing a desired operation at a well-known timing, those operations can be also applied to the embodiment.

<Explanation of the control construction>

Figure 26:
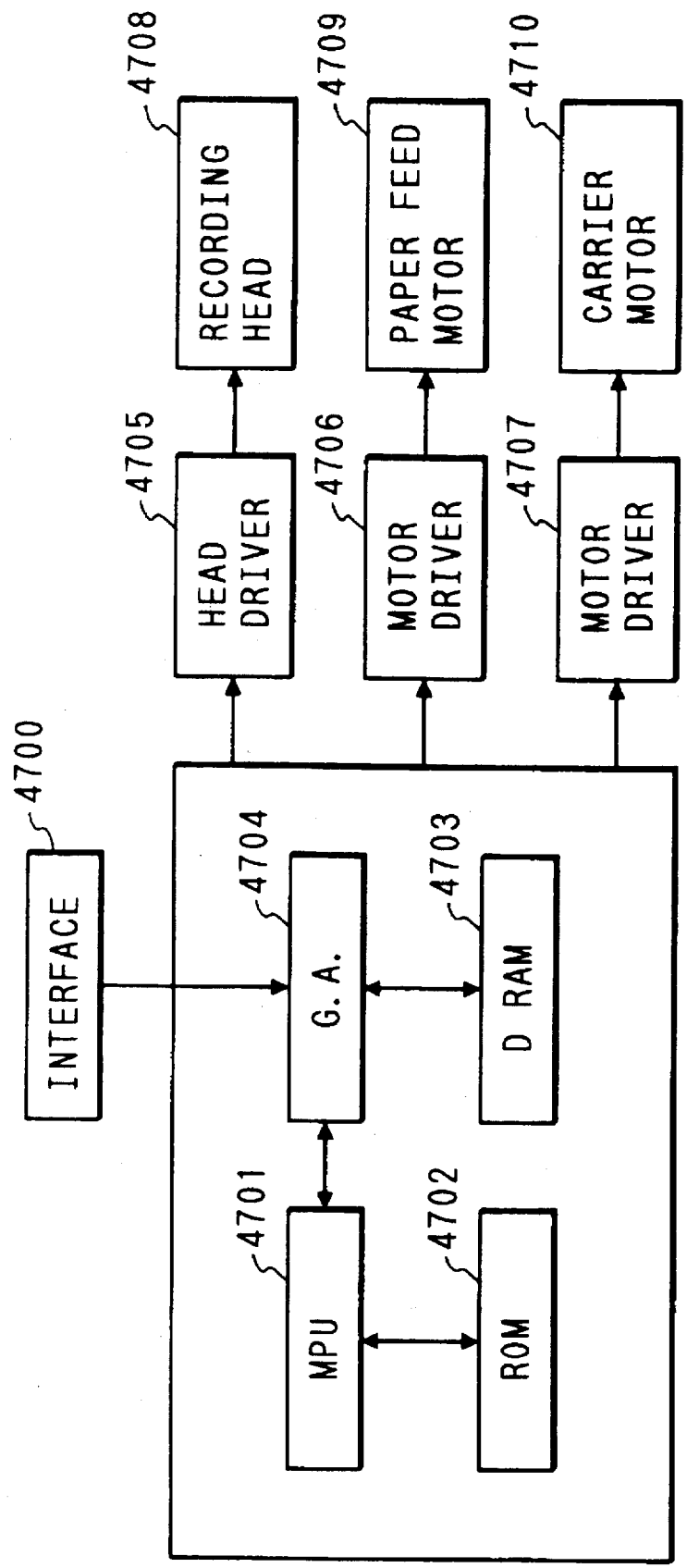
FIG. 26 is a block diagram showing a control construction of the ink jet printer.

A control construction to execute the recording control of the above apparatus will now be described with reference to a block diagram shown in FIG. 26. In FIG. 26 showing a control block, reference numeral 4700 denotes an interface to input a recording signal; 4701 an MPU; 4702 a program ROM to store control programs which are executed by the MPU 4701; 4703 a dynamic type ROM to store various kinds of data (the above recording signal, recording data which is supplied to the head, and the like); 4704 a gate array to supply and control the recording data to a recording head 4708 and for also controlling data transfer among the interface 4700, MPU 4701, and RAM 4703; 4710 a carrier motor to convey the recording head 4708; 4709 a paper feed motor to feed the recording paper; 4705 a head driver to drive the head; and 4706 and 4707 motors to drive the paper feed motor 4709 and the carrier motor 4710, respectively.

The operation of the above control construction will now be described. When a recording signal is supplied to the interface 4700, the recording signal is converted into the recording data for printing between the gate array 4704 and the MPU 4701. The motor drivers 4706 and 4707 are driven. The recording head is driven in accordance with the recording data sent to the head driver 4705 and the printing is performed.

Component elements of the present invention can be assembled to the control construction of the ink jet printer as mentioned above. It will be obviously understood by the following explanation that the present invention is not limited to the laser beam printer but can be also applied to the above ink jet printer or the like.

[Embodiment 1]

The laser beam printer to which the embodiment 1 is applied will now be described hereinbelow.

Figure 1:
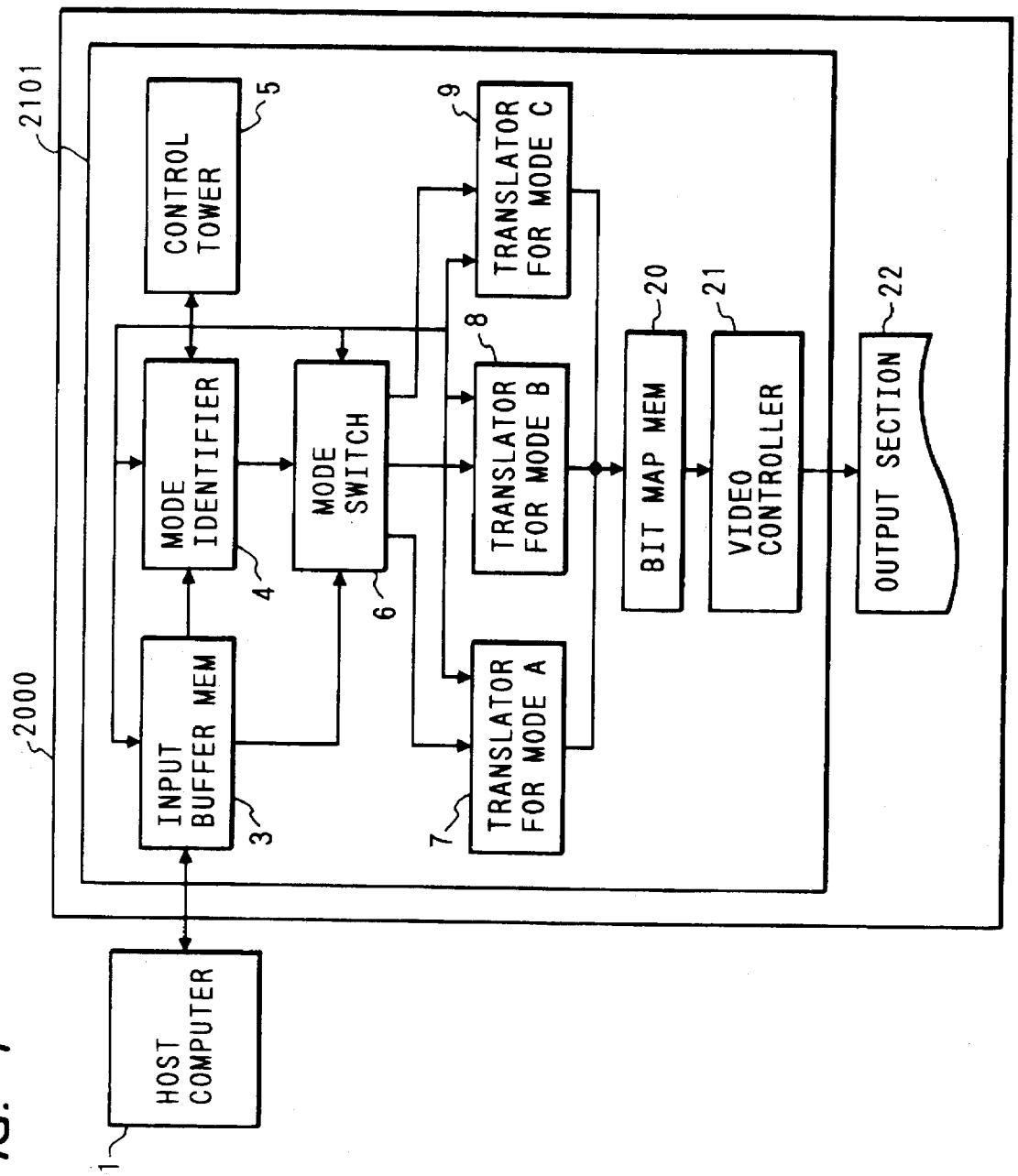
FIG. 1 is a block diagram showing a schematic construction of a printing apparatus according to an embodiment 1.

FIG. 1 is a block diagram showing a schematic construction of the printer (LBP) 2000 according to the embodiment 1. In the diagram, reference numeral 1 denotes a host computer (computer) which transmits print data constructed by code data. The printer 2000 executes the printing operation to the recording paper or the like on the basis of the code data transmitted from the host computer 1. A construction of the printer 2000 will now be described.

Reference numeral 3 denotes an input buffer memory to store the data received from the host computer 1. The memory 3 is constructed by a RAM or the like. Reference numeral 4 denotes a mode identifier to execute the identification of the mode of the received data on the basis of the received code data; 5 a control tower to control the timing for a process of each section, the transmission and reception of data, and the like; 6 a mode switch to select translators (7 to 9) in accordance with the result of identification of the mode of the received data by the mode identifier 4; and 7 to 9 the translators for the modes.

Reference numeral 20 denotes a bit map memory to store bit map data which is obtained by developing the print data by the translators 7 to 9; 21 a video controller for converting the bit map data stored in the bit map memory 20 into the video signal and for supplying to an output section 22; and 22 the output section which can be constructed by a printer engine for executing the printing operation to the recording medium by, for example, a laser beam method or the like or a display apparatus such as a CRT or the like.

The outline of the operation of the printer 2000 with the above construction will now be described hereinbelow.

The data sent from the host computer 1 is stored into the input buffer memory 3. The mode identifier 4 executes an identifying process of the mode of the received data stored in the input buffer memory 3. The mode switch 6 selects either one of the translators 7 to 9 for the modes on the basis of the result of the identification of the mode identifier 4.

Each of the mode translators 7 to 9 converts the received data of each mode into the bit map data for outputting. The produced bit map data is stored into the bit map memory 20 and is converted into the video signal by the video controller 21 and is sent to the output section 22.

The mode identifier 4 will now be described in detail.

Figure 2:
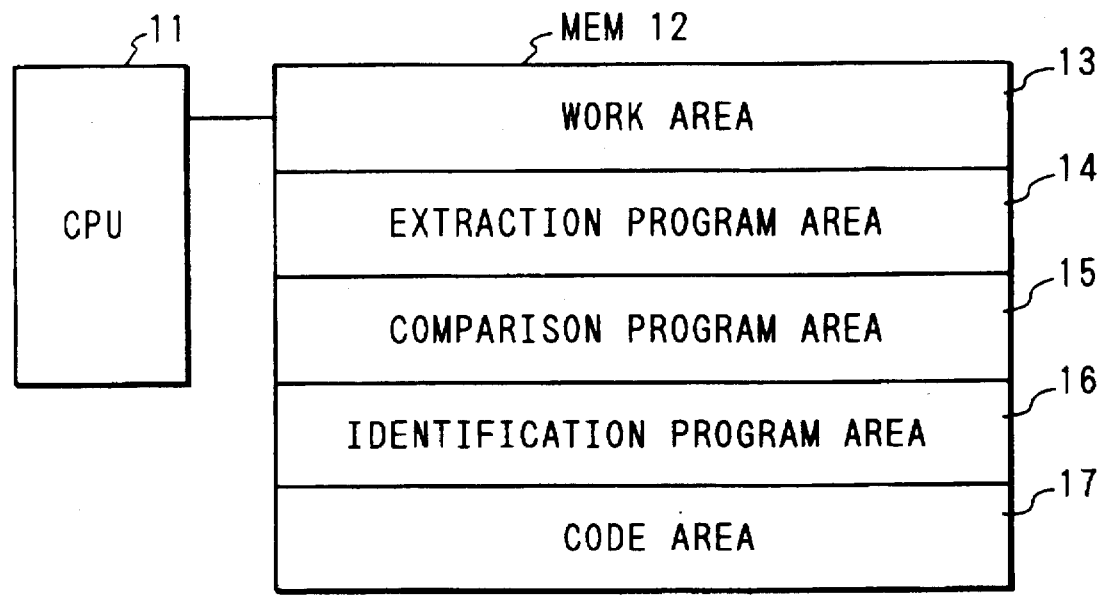
FIG. 2 is a block diagram showing a construction of a mode identifier.

FIG. 2 is a block diagram showing a schematic construction of the mode identifier 4. In the diagram, reference numeral 11 denotes a CPU to execute the identifying process of the mode by executing various kinds of programs stored in a memory 12. The processing program to identify the mode and various data have been stored in the memory 12. The memory 12 has various kinds of the areas as shown below. Reference numeral 13 denotes a work area to temporarily store data when the CPU 11 executes various processes. The work area 13 is constructed by a RAM or the like. Reference numeral 14 denotes a program area to store a processing program to extract a control code and a control code sequence. Reference numeral 15 denotes a program area for comparing the control code and the control code sequence which should be used for mode identification and which have been stored in a code memory area, which will be explained hereinlater, with each code extracted by the extracting process. The program area 15 is constructed by a ROM or the like. Reference numeral 16 denotes a program area to store an identification processing program to execute the mode identifying process by a logical relation. The program area 16 is constructed by a ROM or the like. The contents of the processing programs stored in the above program areas 14 to 16 will be explained in detail hereinlater.

Reference numeral 17 denotes a code memory area to store the inherent control code and control code sequence which are used for identification. FIG. 12 shows a data construction of the code memory area 17. As shown in FIG. 12, each code or a combination with a code sequence (hereinafter, simply referred to as a code 120) has been registered. For each code 120, an appearance frequency probability 122 has been stored every mode 121. The appearance frequency probability 122 indicates a frequency probability such that the code 120 appears in each mode. The number of coincidence times of each code is normalized by using the appearance frequency probability 122 and a possibility (identification degree) of each mode is obtained, thereby identifying the mode. A logical relation 123 will be explained hereinlater.

The operation of the identifying process in the mode identifier 4 with the above construction will now be described.

Figure 3:
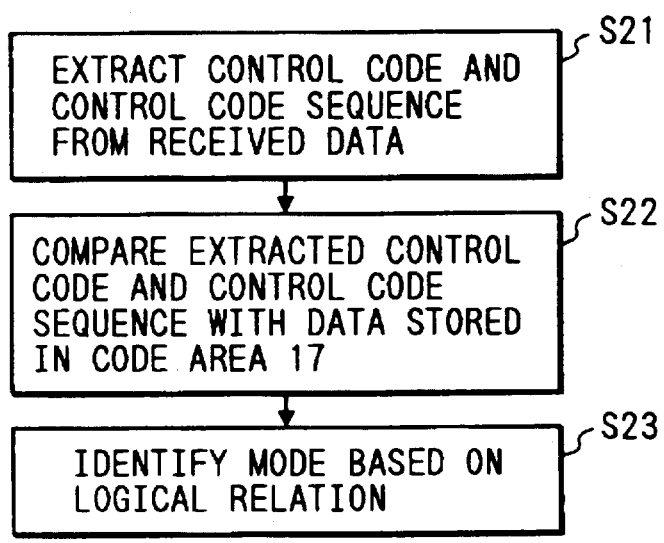
FIG. 3 is a flowchart showing an outline of an identifying process of the embodiment 1.

FIG. 3 is a flowchart showing an example of an identification processing procedure by the CPU 11.

Step S21 relates to a process to extract a control code and a control code sequence from the received data. In step S21, the CPU 11 executes the processing program (shown in a flowchart of FIG. 4, which will be explained hereinlater) stored in the extraction program area 14 mentioned above. Step S22 relates to a process to compare each code extracted in step S21 with the inherent control code and control code sequence stored in the code memory area 17. In step S22, the CPU 11 executes a processing program (shown in a flowchart of FIG. 5, which will be explained hereinlater) stored in the comparison program area 15. Step S23 relates to a process to identify the mode by applying the logical relation to the result of comparison in step S22. In step S23, the CPU 11 executes a processing program (shown in flowcharts of FIGS. 6 to 8, which will be explained hereinlater) stored in the identification program area 16.

The operation of each step in the above identifying process will now be described further in detail.

In the extracting process in step S21, the control code and control code sequence are extracted from the received data. The control code and control code sequence which are used for the identifying process are extracted from the received data stored in the input buffer memory 3 and are temporarily stored into the work area 13 in the memory 12.

Figure 4:
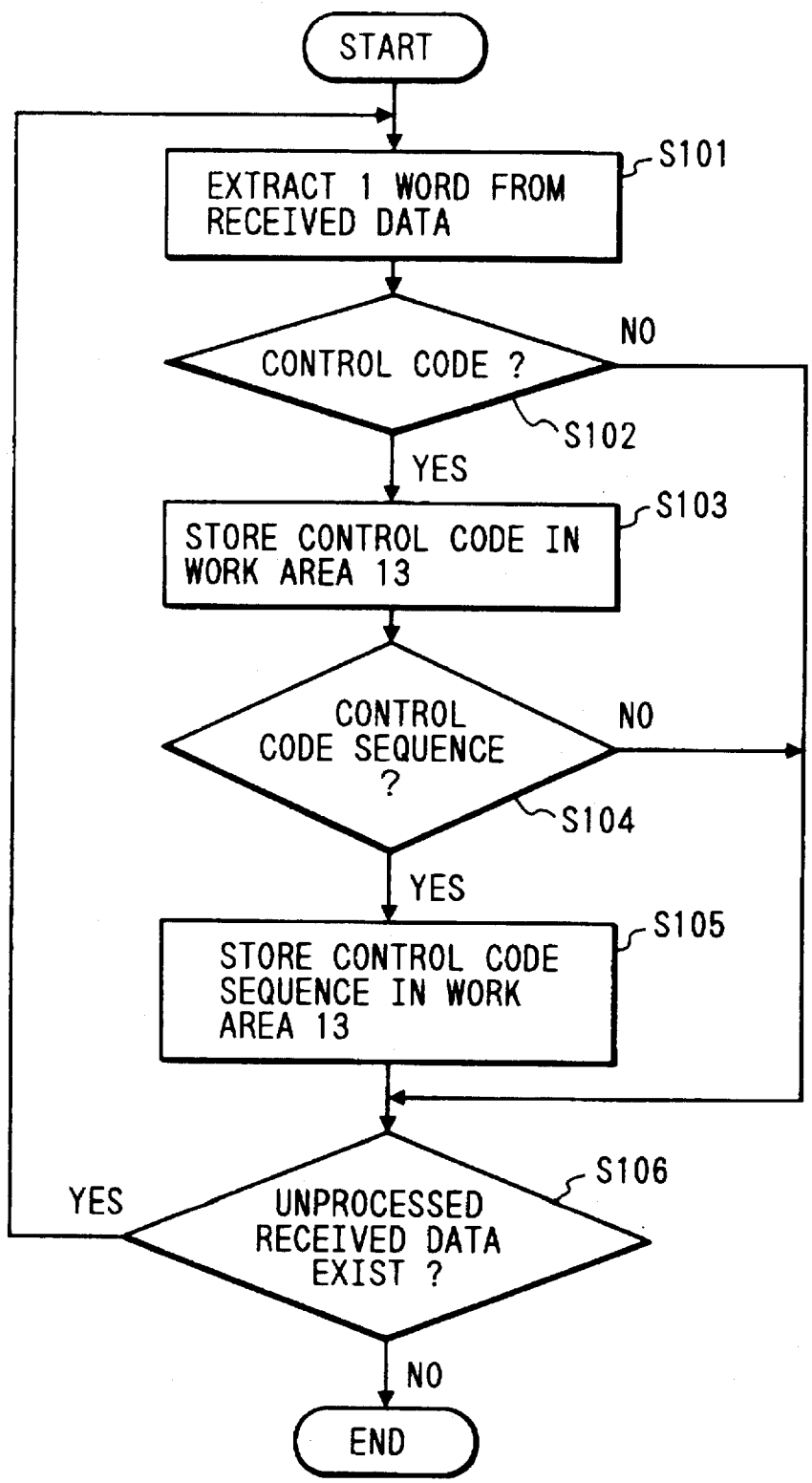
FIG. 4 is a flowchart showing a procedure for an extracting process.

FIG. 4 is the flowchart showing the operation of the extracting process which is executed by the CPU 11 in step S21. First, in step S101, the received data is read out one word by one from the input buffer memory 3. In step S102, a check is made to see if the received data is the code data or not. If YES, step S103 follows. If NO, step S106 follows.

The received data is a set of the control code and the control code sequence having parameter information and has the control code and the control code sequence which differ in accordance with the mode, so that they can be used for identification. As a control code, a code in a range of the values 00 to 1F is used. The control code sequence uses a special code of one or two words subsequent to the control code. Therefore, to extract the control code and the control code sequence, it is sufficient to extract the code in the range of the values 00 to 1F and the code of a few words subsequent to the special code.

In step S102, therefore, a check is made to see if the data of one word which has been read out lies within a range of 00 to 1F or not. In step S103, the data of one word which has been read out is stored as a control code into the work area 13. In step S104, a check is made to see if the control code has a control code sequence or not. If YES, step S105 follows and one or a few words subsequent to the control code are stored as a control code sequence into the work area 13. The number of words of the control code sequence is determined by the control code. Information indicating whether the control code is a control code having the code sequence or not has been stored in the code memory area 17.

On the other hand, when no code sequence exists in step S104, step S106 follows. In step S106, a check is made to see if the received data in which the extracting process is not finished yet exists in the input buffer memory 3 or not. If there is unprocessed data, the processing routine is returned to step S101 and the above processes are repeated. If the processes have been finished for all of the data, the extraction processing routine is finished.

The process to compare the inherent control code and control code sequence in step S22 will now be described. In the comparing process, the control code and control code sequence which have been extracted by the above extracting process are compared with the inherent control code and control code sequence which have been stored in the code memory area 17 and which are used for identification. The sum of the numbers of coincidence times regarding the control codes and control code sequences is temporarily stored into the work area 13.

Practically speaking, the control code and control code sequence which have been stored in the code memory area 17 and which are used for identification are the control code and control code sequence which are inherent in one mode or the control code and control code sequence which are inherent in a small number of modes. "Inherent in one mode" denotes "exists in almost only one mode". "Inherent in a small number of modes" denotes "exists in almost only a small number of modes". Therefore, the above definition means that the control code and control code sequence which appear in the received data in the other modes at a low probability are also included. The above inherent control code and control code sequence are hereinafter referred to as inherent code and code sequence. The inherent code and code sequence stored in the code area 17 are the partial control code and control code sequence which are effective for the mode identifying process.

In the data construction of the code area 17 shown in FIG. 12, whether each code 120 is "inherent in one mode" or "inherent in a small number of modes" mentioned above is distinguished by the logical relation 123.

Figure 5:
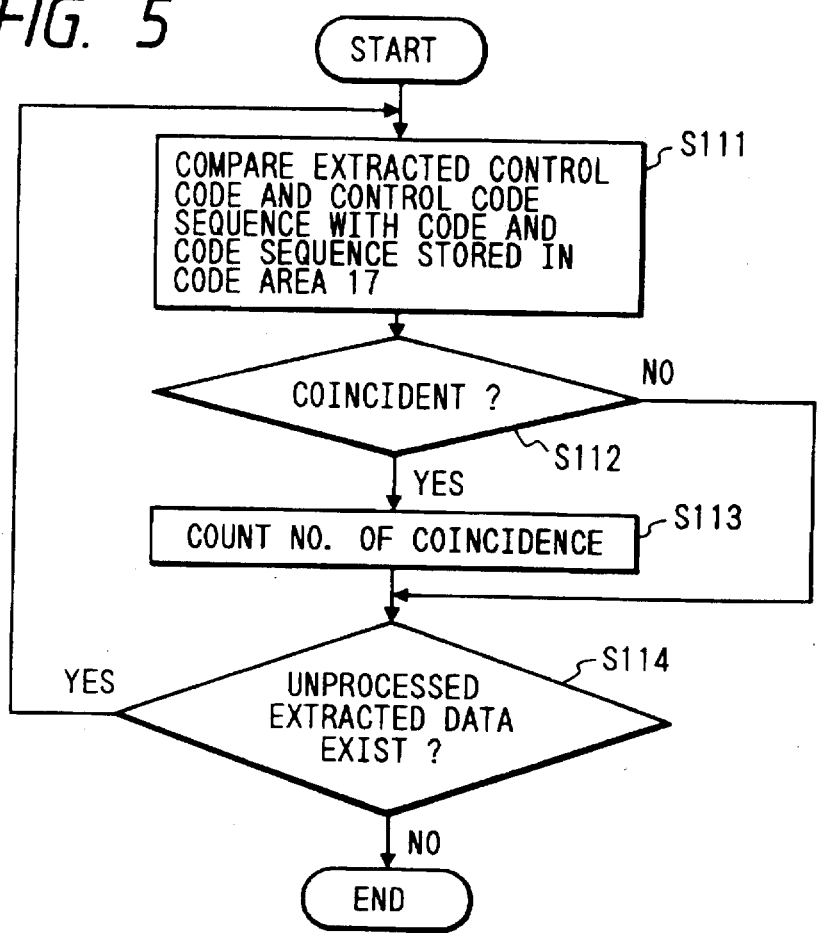
FIG. 5 is a flowchart showing a procedure for a comparing process.

FIG. 5 is a flowchart showing a comparing processing procedure by the CPU 11. In step S111, the extracted control code and control code sequence are compared with the inherent code and code sequence stored in the code area 17. When they coincide, the processing routine advances to step S113 from step S112. As a result of comparison, when the coincident code doesn't exist in the code area, the processing routine advances to step S114 from step S112.

In step S114, a check is made to see if the comparing process has been executed for all of the codes extracted in step S21 or not. When an unprocessed code remains, the processing routine is returned to step S111 and the above processes are repeated. When the process has been finished with respect to all of the codes, the comparing processing routine is finished.

The mode identifying process using the logical relation in step S23 will now be described.

The identifying means in the embodiment 1 is characterized in that in order to increase the number of inherent codes and inherent code sequences which are used for identification, there are used probability-manner relations existing among the code and code sequence which are inherent in each mode, a plurality of codes and code sequences which are inherent in a small number of modes, and the mode.

For such inherent codes and code sequences, the district relations among the feature code and feature code sequence and the mode as in the conventional apparatus cannot be guaranteed. The district relation means a relation such that when code 1 exists, its mode is mode 1 at a probability of 100%. However, since there is a probability-manner relation among the inherent code and inherent code sequence and the mode, the mode identification is executed by using such a relation.

Specifically speaking, to process the probability-manner relation among the inherent code and code sequence and the mode, a coincidence degree among the received data and the inherent code and code sequence is obtained by the comparing process (step S22) and is set to multi-value information. The identifying process (step S23) using the logical relation processes the multi-value information and the probability-manner relation by using the multi-value logical relation or fuzzy logical relation or by using the fuzzy rules and fuzzy inference.

The identifying process using the multi-value logical relation, the identifying process using the fuzzy logical relation, or the identifying process using both of the fuzzy rules and fuzzy inference is selectively used in accordance with a quality (for example, dependency or significance between the relations) of the relations among the inherent code, inherent code sequence, and mode. Such a selective use of the logics in the identifying process is performed in accordance with, for instance, the kind of mode to which the translators 7 to 9 of the printer 2000 correspond. One printer can have a plurality of identification processing logics or can also fixedly have one kind of identifying process.

As practical examples of the identifying process using each process using each logical relation, explanation will now be made by using the following two kinds of logical relations between the inherent code and the mode.

[Logical relation 1]:

if there is an inherent code 1 in the received data, then the mode is the mode 1.

[Logical relation 2]:

if there are an inherent code 11 and an inherent code 12 in the received data, then the mode is the mode 1.

That is, a method of using the multi-value logical relation, the fuzzy logical relation, or both of the fuzzy rules and fuzzy inference will be described with regard to [Logical relation 1] and [Logical relation 2]. In each of the above logical relations, the code 1 is a code which is inherent in mode 1 and the code 11 and code 12 are codes which are inherent in a small number of modes including mode 1.

The process using the multi-value logical relation will be first explained hereinbelow.

Figure 6:
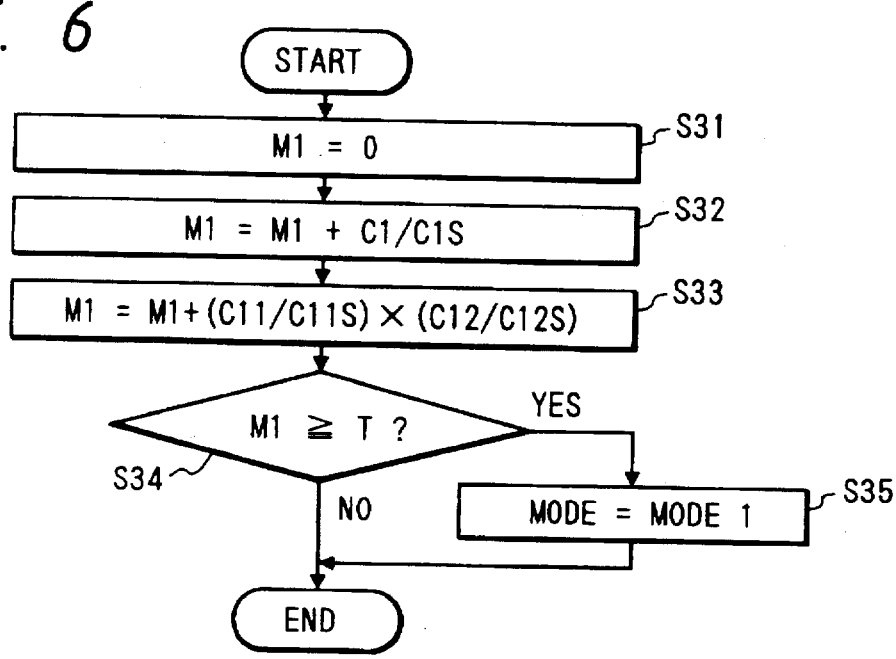
FIG. 6 is a flowchart for an identifying process using a multi-value logical relation.

FIG. 6 is a flowchart showing an identification processing procedure using the multi-value logical relation by the CPU 11. First, in step S31, a variable $M_1$ indicative of a possibility (identification degree) of mode 1 is cleared. After that, the processes using the multi-value relation are executed in steps S32 and S33. The multi-value logic is a logic in which the conventional binary logic has been converted into the multi-value logic. The above [Logical relation 1] and [Logical relation 2] can be expressed by the following functions.

First, [Logical relation 1] is expressed by the multi-value logic.

[Multi-value logical relation 1]:

$$M_1 = C_1/C_1S$$

$M_1$ denotes the possibility (identification degree) of mode 1; $C_1$ indicates the number of inherent codes 1 in the received data obtained in the comparing process S22; and $C_1S$ indicates a numerical value to normalize $C_1$. An object to normalize is to eliminate a deviation of the identification which occurs since in case of individually using a plurality of inherent codes, a probability such that the inherent code appears in the received data differs in dependence on the inherent code. $C_1S$ is obtained from, for instance, the product of the appearance frequency probability of the inherent code 1 in the code sequence data and the number of code sequence data used for identification.

Next, [Logical relation 2] is expressed by the multi-value logic.

[Multi-value logical relation 2]:

$$M_1 = (C_{11}/C_{11}S) \times (C_{12}/C_{12}S)$$

$C_{11}$ and $C_{12}$ denote the number of inherent codes 11 and the number of inherent codes 12 in the received data which have been obtained in the comparing process S22. $C_{11}S$ and $C_{12}S$ indicate numerical values (similar to $C_1S$) to normalize $C_1$ and $C_2$.

In step S32, the variables $M_1$ each showing the probability of mode 1 are added by using the above [Multi-value logical relation 1]. In step S33, the variables $M_1$ are added by using the above [Multi-value logical relation 2]. In step S34, the value of $M_1$ derived in each logical relation is compared with a predetermined threshold value T. When $M_1$ is equal to or larger than T, the result of identification is set to mode 1 in step S35. As mentioned above, the mode identifying process using the multi-value logical relations is executed as mentioned above.

Figures 7, 9:
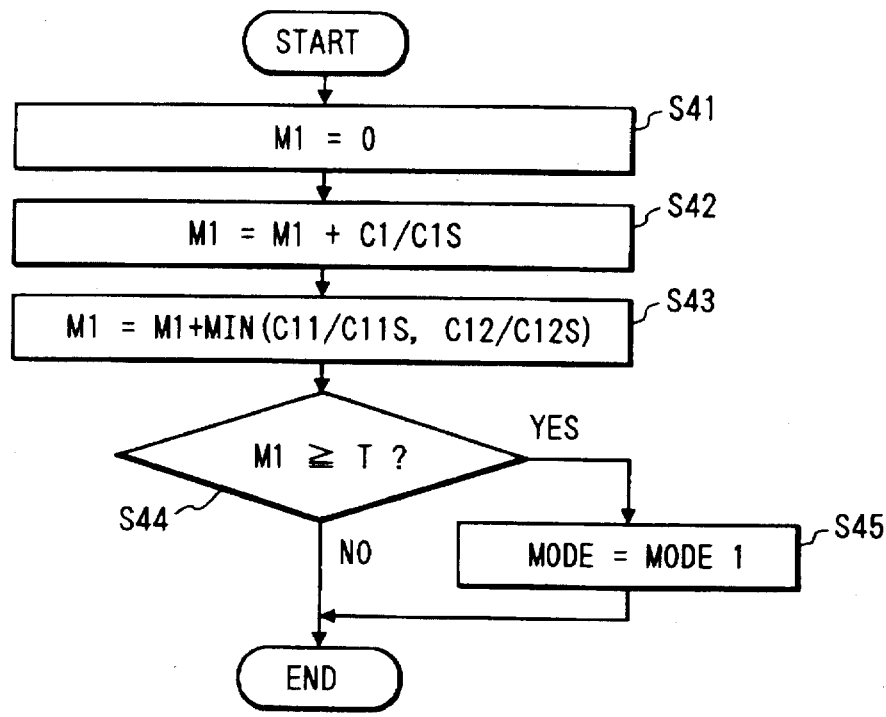
FIG. 7 is a flowchart for an identifying process using a fuzzy logical relation.
FIG. 9 is a diagram showing a rule matrix which is used for the fuzzy inference.

The identifying process using the fuzzy logical relation will now be described. FIG. 7 is a flowchart showing a procedure for the identifying process using the fuzzy logical relation by the CPU 11. In step S41, $M_1$ is cleared. After that, in step S42, the variables $M_1$ are added by using the above [Multi-value logical relation 1]. In step S43, the variables $M_1$ are added by using the fuzzy logical relation.

In the fuzzy logic, the OR (s norm) and the AND (t norm) in the conventional multi-value logic are modal. For instance, as typical ones of the t norm of the fuzzy logic, there are logics called drastic product, limit product, algebric product, and logical product. The logical product is an arithmetic operation to obtain MIN. The algebric product is an arithmetic operation to obtain the multiplication. Those arithmetic operations are selectively used in accordance with the quality of the relation among the inherent code, inherent code sequence, and mode. An example of using the logical product for the above [Logical relation 2] will now be shown.

[Fuzzy logical relation 2]:

$$M_1 = \text{MIN}(C_{11}/C_{11}S, C_{12}/C_{12}S)$$

The above logical arithmetic operation is more effective in the case where the inherent code 11 and the inherent code 12 are independent. In step S42, the variables $M_1$ are added by using the above [Fuzzy logical relation 2]. The subsequent processes are similar to those in case of the multi-value logic. The value of $M_1$ is obtained from each logical relation and when the sum $(M_1)$ is equal to or larger than a predetermined value (T), the result of identification is set to mode 1 (steps S44 and S45).

Finally, the mode identifying method using both of fuzzy rules and a fuzzy inference will now be described. This method is used in the case where it is difficult to handle the relations among the inherent code, inherent code sequence, and mode by the above multi-value logic or fuzzy logic, for example, in case of a vague relation.

Figure 8:
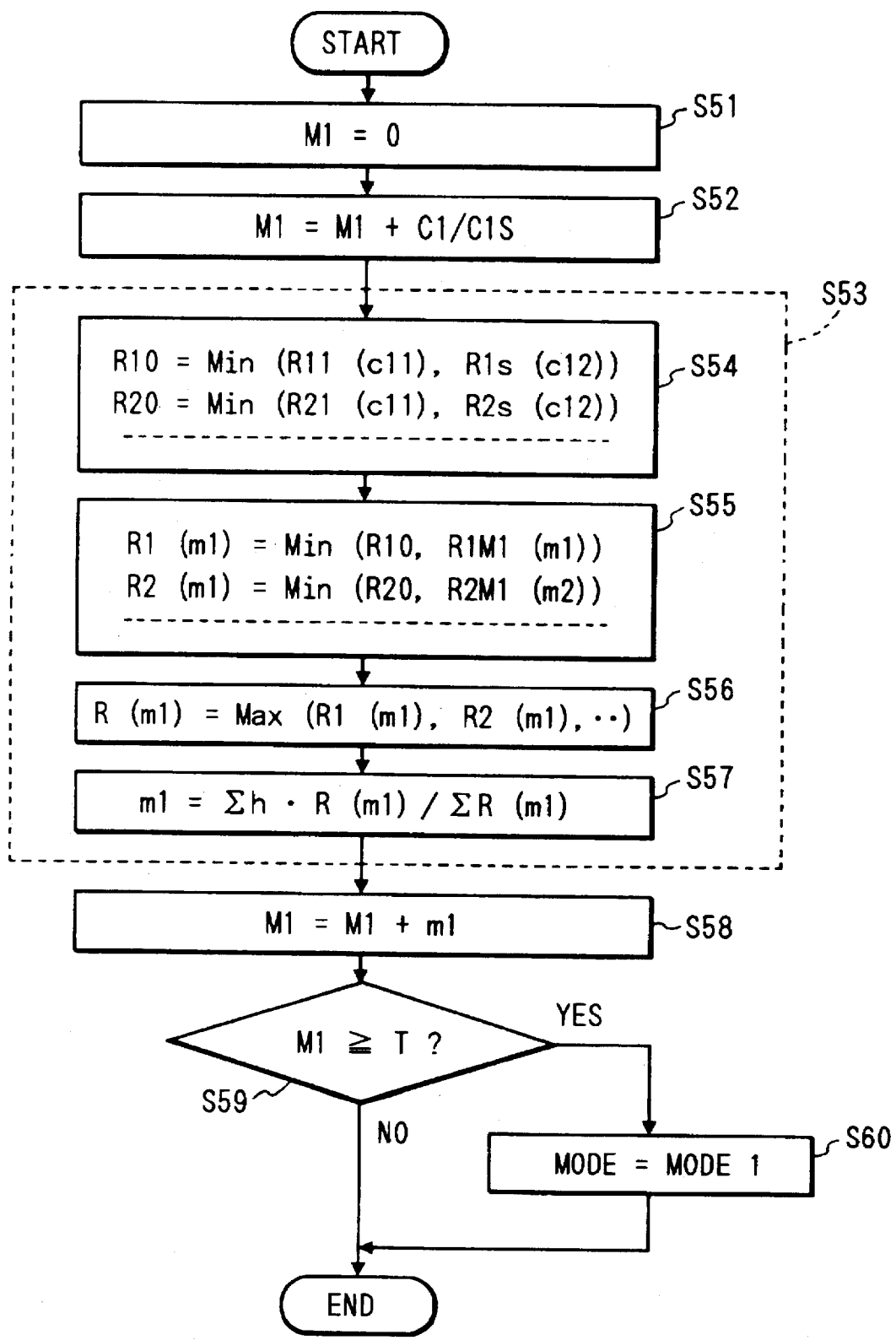
FIG. 8 is a flowchart for an identifying process using a fuzzy rule and a fuzzy inference.

FIG. 8 is a flowchart showing a procedure for the identifying process using the fuzzy rules and fuzzy inference by the CPU 11. In step S51, $M_1$ is cleared. After that, in step S52, the values of $M_1$ are added by using the foregoing [Multi-value logical relation 1]. In step S53, the process regarding the foregoing [Logical relation 2] are executed by using the fuzzy rules and fuzzy inference. The process in step S53 will now be described in detail hereinbelow.

Figure 10A:
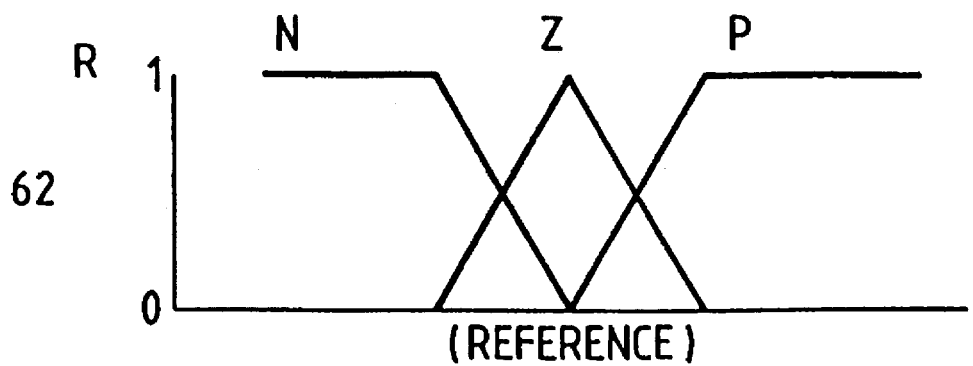
FIG. 10 includes FIGS. 10A–10C which are diagrams showing membership functions which are used for the fuzzy inference.
Figure 10B:
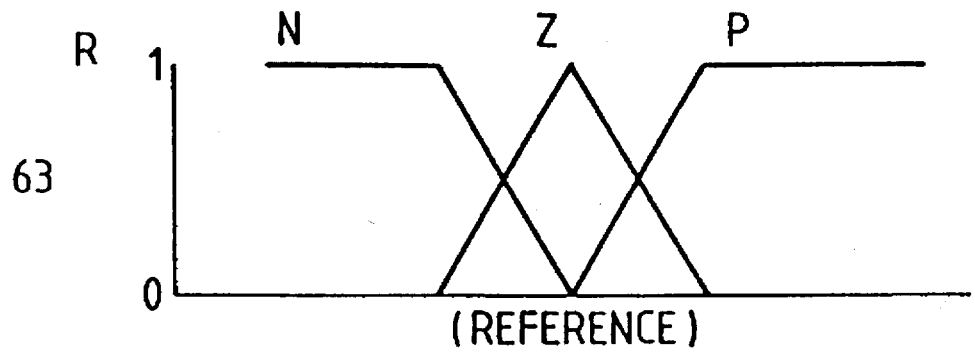
Figure 10C:
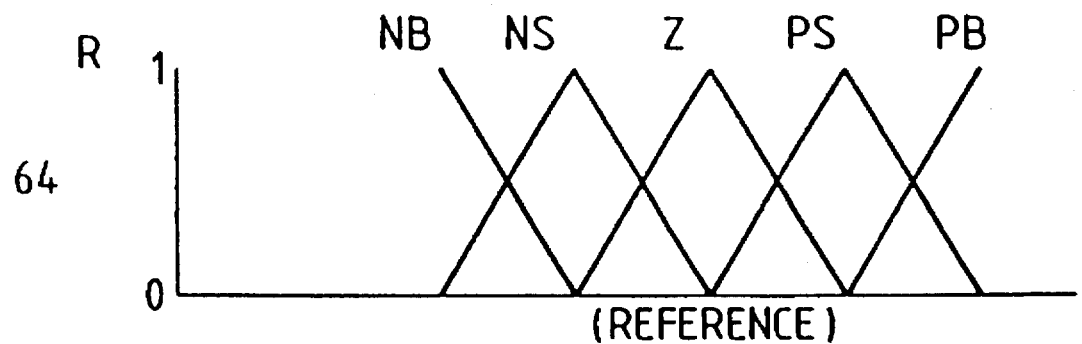

FIG. 9 is a diagram showing a rule matrix. FIGS. 10A–10C are diagrams showing membership functions Reference numeral 61 denotes a rule matrix; and 62 to 64 indicate membership functions. In the rule matrix, the sum of a coincidence degree $(c_{11})$ of the inherent code 11 and a coincidence degree $(c_{12})$ of the inherent code 12 indicates a condition variable. A possibility $(m_1)$ of the mode 1 indicates a conclusion variable. The coincidence degree of each code is obtained by normalizing the number of coincidence times of each code. For instance, $c_{11}$ is expressed as follows by the foregoing number $C_{11}$ of coincidence times and the numerical value $C_{11}S$ for normalization:

$$c_{11} = C_{11}/C_{11}S$$

The rule matrix 61 expresses the following fuzzy rules. An example of fuzzy rules will now be shown below.

[Fuzzy rule 1]

if $c_{11}$ is N and $c_{12}$ is Z then $m_1$ is NS

This rule shows the relation "if the coincidence degree $(c_{11})$ with the inherent code 11 is smaller (N) than a reference value and if the coincidence degree $(c_{12})$ with the inherent code 12 is equal to a reference value (Z), the possibility $(m_1)$ of mode 1 is slightly smaller (NS) than the reference value".

[Fuzzy rule 2]

if $c_{11}$ is Z and $c_{12}$ is Z then $m_1$ is Z

This rule shows the relation "if the coincidence degree $(c_{11})$ with the inherent code 11 is equal to a reference value (Z) and if the coincidence degree $(c_{12})$ with the inherent code 12 is equal to the reference value (Z), the possibility $(m_1)$ of mode 1 is equal to the reference value (Z)".

The relations in the remaining fuzzy rules can be also similarly expressed. The above relations are probability-manner and there is a fuzzy inference as means for using such probability-manner relations for information processes or the like.

The process using the fuzzy inference in step S53 in FIG. 8 will now be practically explained with reference to FIGS 11A1 and 11B1. In FIG. 11, reference numerals 71 and 72 denote show states in which the comparison degree with the antecedent part of the foregoing fuzzy rule 1 is obtained from the coincidence degree of the inherent code by using the membership functions. Similarly, reference numerals 73 and 74 in FIGS. 11A2 and 11B2 show states in which the comparison degree with the antecedent part of the fuzzy rule 2 is obtained. Reference numerals 75 and 76 in FIGS. 11C1 and 11C2 show states in which the results of the fuzzy rules 1 and 2 are obtained from the membership functions of the consequent parts, respectively. Reference numeral 77 in FIG. 11D shows a state in which the results of the fuzzy rules 1 and 2 are synthesized and a crisp value is obtained by a method of elastic center.

Each of steps S54 to S57 constructing step S53 in FIG. 8 will now be further described.

In step S54, the comparison degree of the coincidence degree $c_{11}$ between the antecedent part of each fuzzy rule and the inherent code 11 and the coincidence degree $c_{12}$ with the inherent code 12 is obtained. That is, as shown by reference numerals 71 to 74 in FIGS.11A1, 11A2, 11B1, and 11B2, the comparison degree with the antecedent part of each fuzzy rule is obtained from the coincidence degree with the inherent code 11 and the coincidence degree with the inherent code 12 and the membership functions. More specifically speaking, in each membership function, individual reversion degrees of the coincidence degree with the inherent code 11 and the coincidence degree with the inherent code 12 are obtained and smaller one (Min) of them is set to a comparison degree with the antecedent part of each fuzzy rule. For instance, in order to obtain the comparison part with the antecedent part of the fuzzy rule 1, a reversion degree $R_{11}$ of the coincidence degree $(c_{11})$ with the inherent code 11 is first obtained from the membership function (N) shown by 71 in FIG. 11. Similarly, as shown by 72, a reversion degree $R_{1s}$ of the coincidence degree $(c_{12})$ with the inherent code 12 is obtained from the membership function (Z). Smaller one of the values of the reversion degrees $R_{11}$ and $R_{1s}$ obtained by the above processes is set to a comparison degree $R_{10}$ with the antecedent part. Talking about the relations of 71 and 72 in FIGS. 11A1 and 11B1, $R_{10}=R_{1s}$. Likewise, reference numerals 73 and 74 indicate states in which the comparison degree with the foregoing fuzzy rule 2 is obtained. The comparison degree with the fuzzy rule 2 is such that $R_{20}=R_{21}$.

In step S55, the process to obtain the result from the consequent part of each fuzzy rule is executed. As shown by 75 and 76 in FIGS. 11C1 and 11C2, the result of each fuzzy rule is obtained by using an implication rule from the result in step S54 and the membership function of the possibility of mode 1. For instance, Min of the comparison degree with the antecedent part as a result in step S54 and the membership function of the possibility of mode 1 is calculated. By the above processes, the hatched portions in the regions shown by 75 and 76 are extracted.

In step S56, Max of the results of the fuzzy rules obtained by the fuzzy rules 1 and 2 is obtained, thereby synthesizing the results. That is, as shown by 77 in FIG. 11C the synthesis of the results (hatched portion) of the individual fuzzy rules derived in step S55 is obtained.

In step S57, the process to convert the fuzzy amount into the crisp amount is executed. As shown by 77 in FIG. 11D, since the amount obtained in step S56 is a fuzzy amount, it is converted into the crisp value by using, for example, a method of elastic center. Such a value indicates a conclusion ($m_1$) obtained by the fuzzy inference.

In step S58, the value of above $m_1$ is added to the value of $M_1$. The subsequent processes are similar to those in case of the multi-value logic. The value of $M_1$ is obtained from each fuzzy rule and the fuzzy inference and when the sum of the values of $M_1$ is equal to or larger than the predetermined value T, the result of identification is set to mode 1.

According to the fuzzy inference process in step S53 in FIG. 8, by previously obtaining the identification degree of mode 1 by calculations for the sum of the coincidence degree of an arbitrary mode 1 and the coincidence degrees of the other modes and by storing those identification degrees into a memory as a table form, the result is obtained by merely searching it from the memory at the processing stage, so that the calculating process can be omitted.

As described above, according to the mode identifying method in the printer of the embodiment 1, the following effects are obtained.

1. The inherent code and inherent code sequence can be used for identification, so that an amount of information which can be used for identification increases and the identification ratio is improved.

2. The probability-manner relations among the inherent code, inherent code sequence, and mode are used for identification, so that strictness which is required for the process to extract the code and code sequence from the received data is lightened and the extracting process can be simplified.

3. The probability-manner relations among the inherent code, inherent code sequence, and mode are used for identification, for changes in inherent code and inherent code sequence in association with the addition of a new mode or the version-up, it is possible to cope with such changes without a strict analysis.

Although the embodiment 1 has been described with respect to the example in which the fuzzy rules and fuzzy inference are used for [Logical relation 2], the fuzzy rules and fuzzy inference can be also used for [Logical relation 1].

Similar processes can be also executed in the cases where the number of variables of the antecedent part is larger.

Another preferred embodiment of the present invention will be further described with reference to the drawings.

[Embodiment 2]

In the printing apparatus which can cope with a plurality of modes, a construction which can cope with all of ten or more kinds of modes results in an increase in costs, so that such a construction is not used. In general, the printer has two or three kinds of built-in modes (for example, a mode which is recommended by the manufacturer of the printer and another mode of a high use frequency which has previously been built in the apparatus) and a card mode in which them ode that is designated by the user is stored in a card and the card is inserted into the apparatus as necessary and is used.

Since it is the present situation in the printers, it is practically sufficient that a plurality of built-in modes and the card mode can be distinguished. That is, the mode as a target to be identified can be almost limited. Although the built-in modes are specified when the apparatus is manufactured, there are circumstances which are peculiar to the printer such that the card mode cannot be specified until the card is inserted into the apparatus. There are also circumstances on the user side such that there are some users who don't use the card mode.

The identifying method of the embodiment 2 is adapted to a situation of the printer as mentioned above and accomplishes a high recognition ratio and the reduction of the identifying time.

Figure 13:
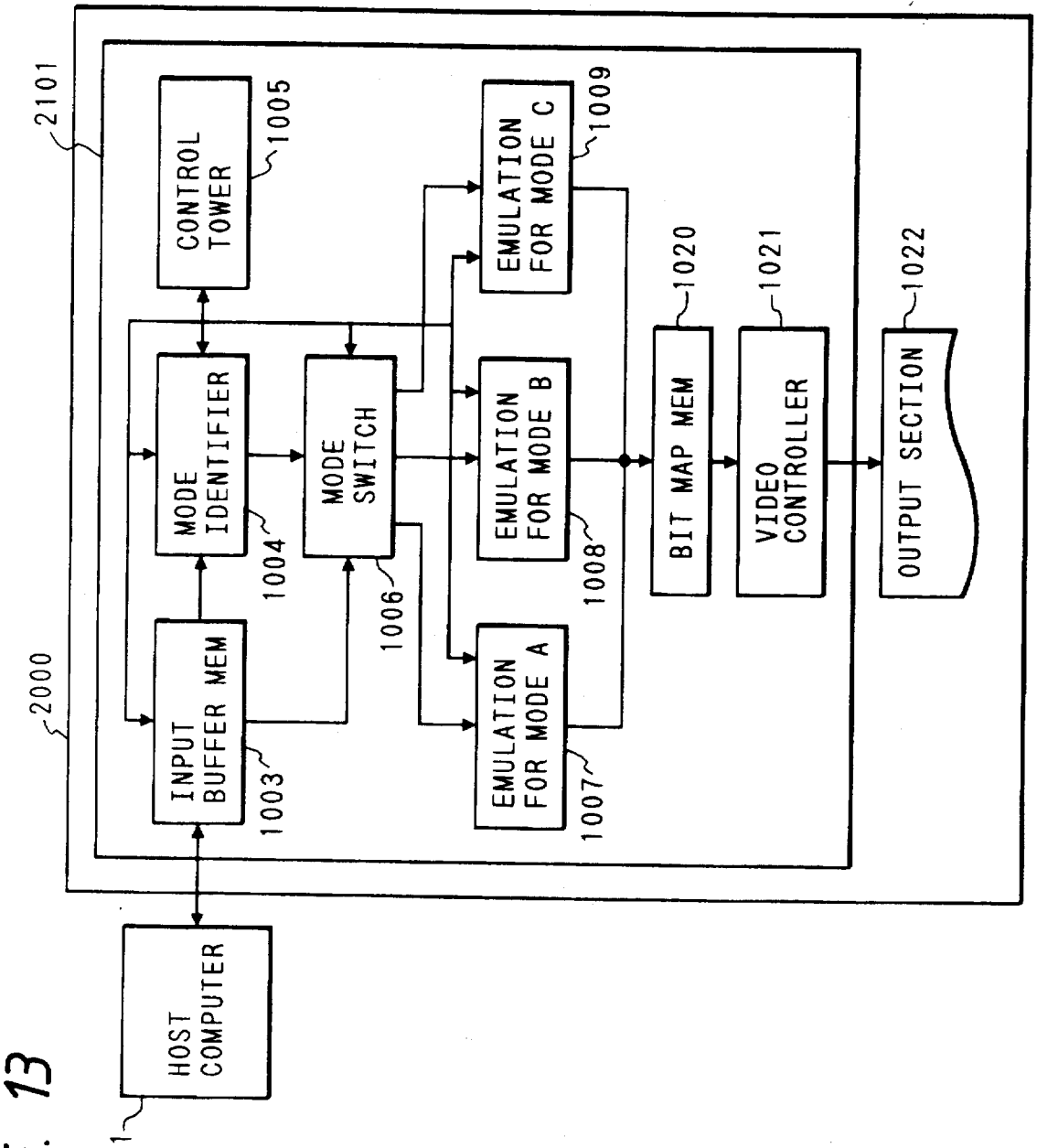
FIG. 13 is a block diagram showing a functional construction of a control section of a printing apparatus according to an embodiment 2.

FIG. 13 is a block diagram showing a functional construction of a control section of the printer according to the embodiment 2. In the diagram, reference numeral 1 denotes the host computer for encoding print data in accordance with a certain mode and for transmitting the coded data to the printer 2000. The printer 2000 has a function which can cope with the code data of a plurality of modes. The printer 2000 has the following construction. Reference numeral 1003 denotes an input buffer memory to temporarily store the code data which is transmitted from the host computer 1; 1004 a mode identifier to identify the mode to which the code data belongs; 1005 a control tower to perform a concentration management of the input buffer memory 1003, them ode identifier 1004, a mode switch 1006, and emulations 1007, 1008, and 1009; 1006 the mode switch which receives the result of identification of the mode identifier 1004 and selects any one of the emulations 1007 to 1009; 1007 and 1008 the emulations to output for built-in modes (A, B); and 1009 the emulation to output for a card mode (C).

Each of the emulations 1007 to 1009 of the modes converts the received data in each mode into the bit map data to output. The produced bit map data is stored into a bit map memory 1020 and is converted into the video signal by a video controller 1021. The video signal is sent to an output section 1022. The timings for the above processes and the transmission and reception of data are controlled by the control tower 1005.

The operation of the printer will now be described hereinbelow.

The host computer 1 transmits the control data necessary to print and the coded data of the image data to the printer 2000. In the conventional printer having only one mode, the received data is merely directly converted into the data suitable to print and is printed. However, in the printer having a plurality of modes like the printer of the present invention, it is necessary to identify the mode. For this purpose, the transmission data from the host computer 1 is once stored into the input buffer memory 1003. The control tower 1005 controls the whole printer so that the processes are executed in accordance with the order, which will be explained hereinbelow.

First, the mode identifier 1004 automatically identifies the mode from the received data stored in the input buffer memory 1003. Them ode switch 1006 selects and switches one of the emulations 1007 to 1009 in accordance with the result of identification. The mode switch 1006 sends the received data stored in the input buffer memory 1003 to the selected emulation. The selected emulation subsequently converts the transferred received data into the bit map data. The bit map data is stored into the bit map memory 1020. The video controller 1021 converts the bit map data stored in the bit map memory 1020 into the video signal and supplies the video signal to the output section 1022. The output section 1022 can be constructed by a printer engine to print onto a recording medium by, for example, a laser beam method or can be also constructed by a display such as a CRT or the like.

An identification processing procedure of the mode identifier 1004 will now be described. As mentioned above, the mode identifier 1004 is constructed by a CPU, a memory, and the like. The CPU executes each program to execute each identifying process or the like which has been stored in the memory, thereby performing each of the identifying processes, which will be explained hereinafter.

Figure 14:
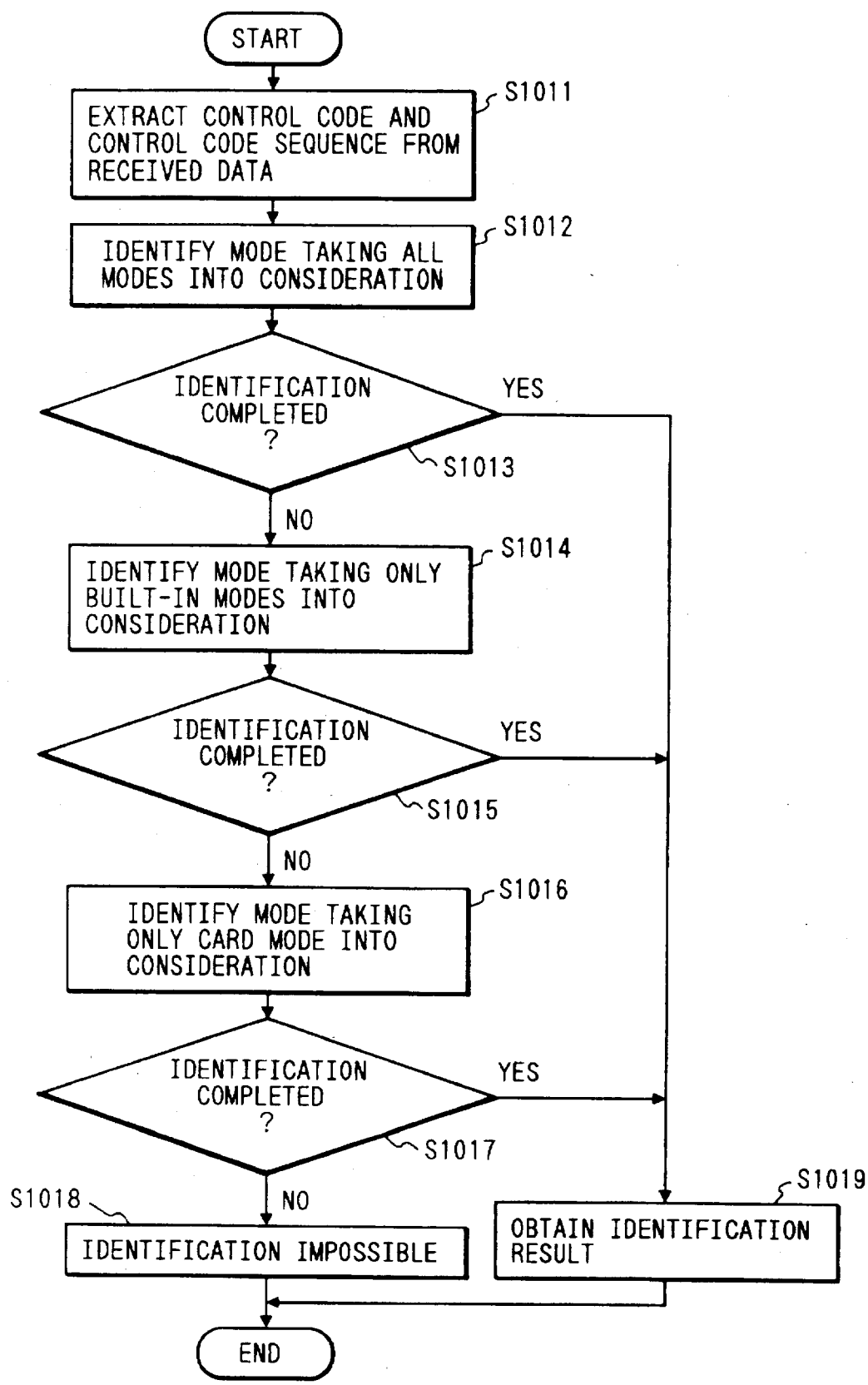
FIG. 14 is a flowchart showing a procedure for a mode identifying process according to the embodiment 2.

FIG. 14 is a flowchart showing a procedure for a mode identifying process in the embodiment 2. In step S1011, the control code and control code sequence are extracted from the received data, in step S1012, all of them odes including the built-in modes and the card mode of a high use frequency are set to targets for identification. The control code and control code sequence which are peculiar to each mode are used as feature codes and the identifying process is executed. In step S1013, a check is made to see if the mode has been identified in step S1012 or not. If the mode has been identified, step S1019 follows and the identified mode is set to the result of identification. When the mode is not identified in step S1012, step S1014 follows.

In step S1014, the built-in modes are set to target for identification and the control code and control code sequence existing in the built-in modes are used as feature codes and the identifying process is executed. In step S1015, a check is made to see if the mode has been identified in step S1014 or not. If the mode has been identified, step S1019 follows and the identified mode is set to the result of identification. If the mode is not identified in step S1014, step S1016 follows.

In step S1016, only the card mode is set to a target for identification and the control code and control code sequence existing in the card mode are used as feature codes and the identifying process is executed. In step S1017, a check is made to see if the mode has been identified in step S1016 or not. If the mode has been identified, step S1019 follows and the identified mode is set to the result of identification. When the mode is not identified in step S1016, step S1018 follows and it is concluded that the identification cannot be performed.

The process in each of the above steps will be further described in detail.

The received data from the host computer 1 comprises an image data code using a byte as a minimum unit and a control code using a word as a minimum unit. Codes of 00 to 1F and 80 to 9F are allocated to the control codes. The control codes comprises an I/O command between the host computer 1 and the printer 2000 and a command to control the printing operation. The control code sequence is a command to mainly control the printing operation, the kind of command is expressed by the code of one or two words subsequent to the control code and the parameter is expressed by the further subsequent code.

When the parameter is used as a feature of the identification, there occurs a necessity to interpret the content of the control code sequence. Therefore, the identifying speed is set to a slow speed. The code of one or two words subsequent to the control code indicates the kind of command and is inherent in mode. In case of using such a control code sequence as a feature of the identification, there is no need to understand the content. Therefore, the identifying speed is not slow. In the embodiment 2, the code which is constructed by one or two words subsequent to the control code is called a control code sequence and is used as a feature code. Among those control codes and control code sequences, there are a number of such control codes and control code sequences which exist in only one mode. There are also a number of control codes and control code sequences which exist in only two special modes. Therefore, the identifying process using those codes as feature codes can provide a high identification ratio and a high identifying speed.

Figure 15:
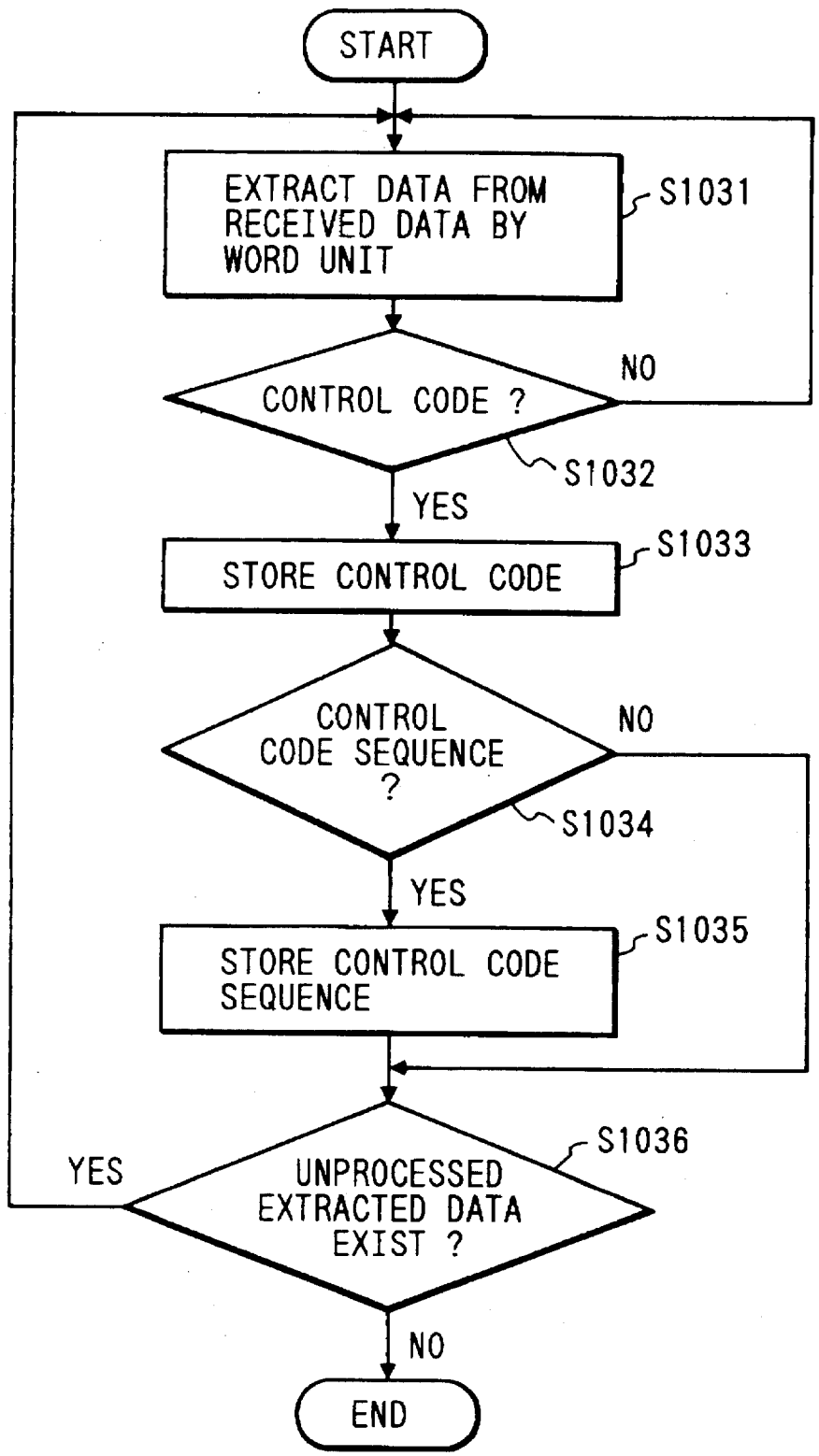
FIG. 15 is a flowchart showing a detailed procedure of a process for extracting a control code and a control code sequence from the received data.

FIG. 15 is a flowchart showing a detailed procedure for the process (step S1011) to extract the control code and control code sequence from the received data.

In step S1031, the received data is extracted on a byte unit basis, the data is subsequently extracted on a word unit basis, and the code data of the word unit is produced. In step S1032, a check is made to see if the code data lies within a range from [00–1F] to [80–9F] or not. If YES, it is determined that the code data indicates the control code. When the code data indicates the control code in step S1032, step S1033 follows. If NO, the processing routine is returned to step S1031 and the processes are executed for the next received data. In step S1033, the code which has been concluded to be a control code is stored.

In step S1034, a check is made to see if the extracted control code has the control code sequence or not by comparing with the control code which has previously been registered. If NO, step S1036 follows. If YES, step S1035 follows and the control code sequence of one or two words subsequent to the control code is stored. A check is made in step S1034 to see if the control code sequence is constructed by one word or two words.

In step S1036, a check is made to see if the unprocessed received data exists or not. If YES, the processing routine is returned to step S1031 and the above processes are repeated. If no unprocessed data exists, the processing routine is finished. The control code and control code sequence are extracted by the above processes.

The operation of the identifying process (step S1012) using the control code and control code sequence which are inherent in each mode will now be described.

The identifying process in step S1012 can be realized by the sequence logical process. For easy explanation, it is now assumed that the control code or control code sequence group existing in only mode A is set to a feature code group $A_c$, the control code or control code sequence group existing in only mode B is set to a feature code group $B_c$, and the control code or control code sequence group existing in only mode C is set to a feature code group $C_c$.

Figure 16:
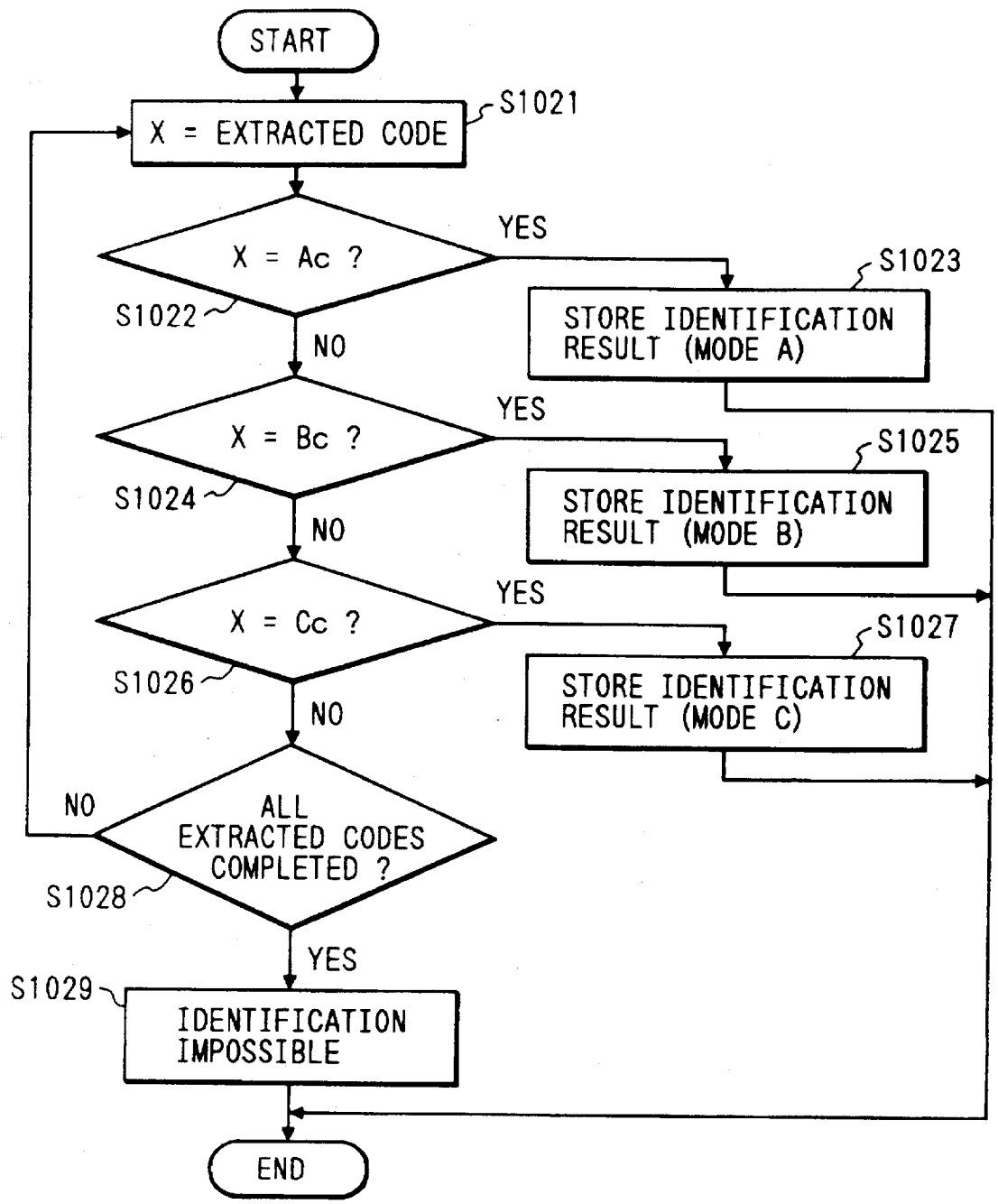
FIG. 16 is a flowchart showing a procedure for an identifying process using a control code and a control code sequence which are inherent for each mode.

FIG. 16 is a flowchart showing a procedure for the identifying process (step S1012) using the control code and control code sequence which are inherent in each mode. In step S1021, the extracted control code and control code sequence (extracted code) are read out and substituted for X.

In step S1022, a check is made to see if the read-out extracted code X coincides with either one of the feature code group $A_c$ or not. If there is the coincident feature code, step S1023 follows. In step S1023, the result of identification (in this case, mode A) is stored into the memory. If there is no coincident feature code in step S1022, step S1024 one of the feature code group $B_c$ or not. If YES, follows. In step S1024, a check is made to see if the code stored in the memory coincides with either step S1025 follows. In step S1025, the result of identification (in this case, mode B) is stored into the memory. If NO in step S1024, step S1026 follows. In step S1026, a check is made to see if the code stored in the memory coincides with either one of the feature code group $C_c$ or not. If YES, step S1027 follows. In step S1027, the result of identification (in this case, mode C) is stored into the memory. If NO in step S1026, step S1028 follows and a check is made to see if the processes have been completed with respect to all of the extracted codes or not. If YES, it is decided in step S1029 that the identification is impossible. The processing routine is finished. If NO, the processing routine is returned to step S1021 and the above processes are repeated for the next extracted code.

In the above identifying process, the process is finished when the extracted code coincides with the feature code in each of the above discriminating processes (steps S1022, S1024, S1026), so that the high-speed identifying process can be realized.

As described above, in the identifying process (step S1012) in which all of the modes including the built-in modes and the card mode or the mode of a high use frequency are/is set to targets for identification, the control code or control code sequence having a high identifying capability, namely, the control code and control code sequence which are inherent in each mode are used as feature codes and the identifying process is executed. Therefore, as compared with the identifying process in which all of the control codes and control code sequences are used as features, there is an advantage such that the mode can be identified at a high speed because small number of special control codes or control code sequences are used as feature codes.

A procedure for the identifying process (step S1014) taking the built-in modes into consideration will now be described. For easy explanation, the case where there are modes A and B as built-in modes will now be explained. Therefore, the identifying process taking the built-in modes into consideration identifies the mode A, mode B, and the others (assumes mode X).

As an identifying method, the following two kinds of methods can be used.

(1) Method whereby for each of the mode A and mode B, the mode is identified in accordance with whether the ratio at which the code coincides with the control code or control code sequence in the received data is larger or smaller than a predetermined threshold value.

(2) Method whereby the relations among the codes used as feature codes and the modes A, B and X are shown by logics and the mode is identified by the sequence logical process.

The method (1) can be easily realized by comparing the feature code and the extracted code from the received data and by obtaining the number of coincidence times. Therefore, its description is omitted here. In the embodiment 2, it is assumed that the mode is identified by the method (2) (sequence logical process) and its operation processing procedure will now be described.

Figure 17:
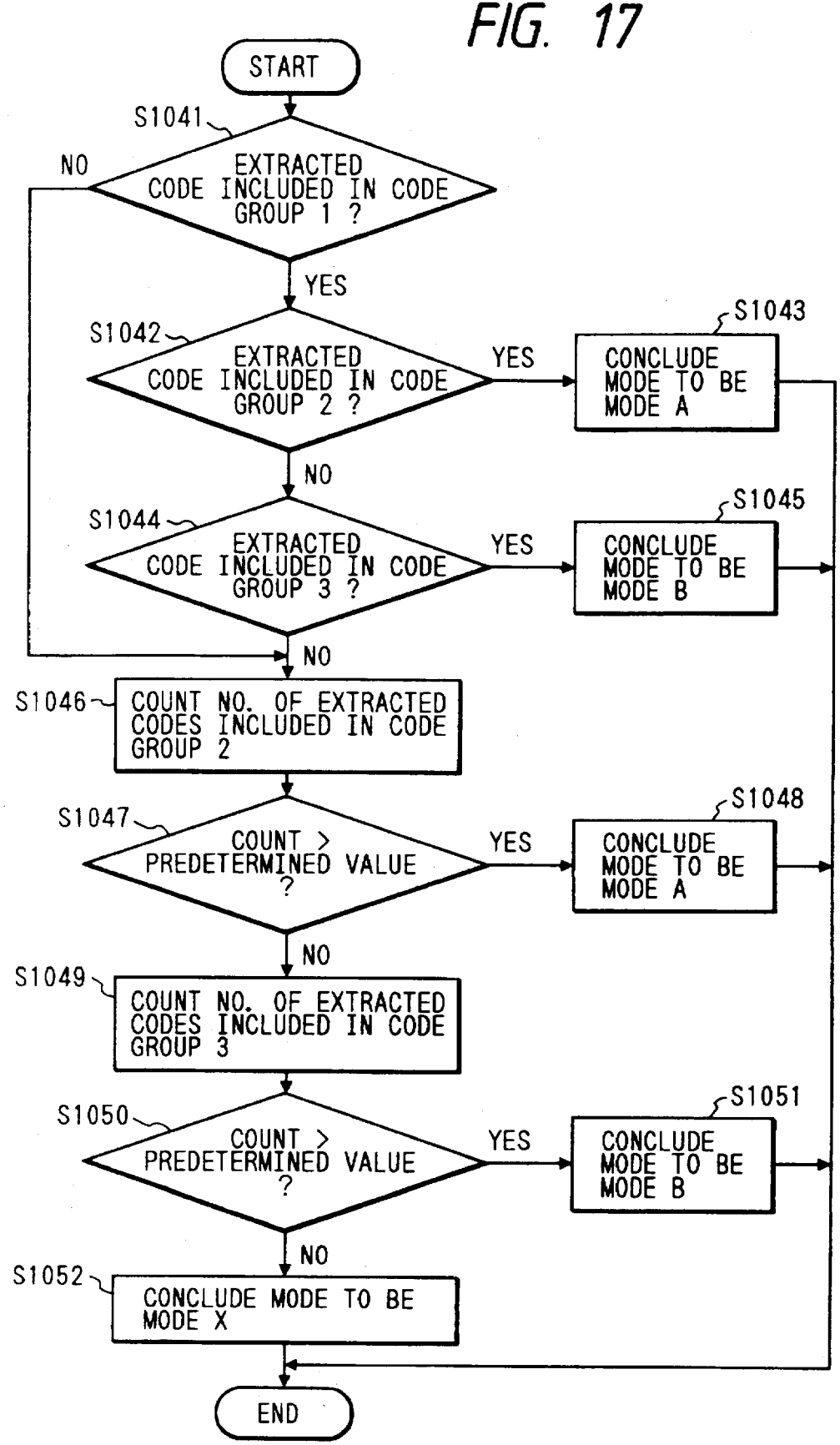
FIG. 17 is a flowchart showing a processing procedure for an identifying process taking built-in modes into consideration.

FIG. 17 is a flowchart showing a procedure for the identifying process taking the built-in modes into consideration. For easy explanation, it is now assumed that the control code and control code sequence group existing in only the modes A and B are set to a feature code group 1. Similarly, a code group existing in only the modes A and X (doesn't exist in mode B) is set to a feature code group 2. A code group existing in only the modes B and X (doesn't exist in mode A) is set to a feature code group 3.

When the code which belongs to the feature code group 1 exists in the extracted codes in step S1041, step S1042 follows. In step S1042, when a code which belongs to the feature code group 2 exists in the extracted codes, step S1043 follows and the result of identification is set to mode A. That is, when a code which belongs to the feature code group 1 and a code which belongs to the feature code 2 exist in the extracted codes, the mode A is identified. In step S1042, when a code which belongs to the feature code group 2 doesn't exist, step S1044 follows. In step S1044, when a code which belongs to the feature code group 3 exists in the extracted codes, step S1045 follows and the result of identification is set to mode B. Namely, when the codes 1 and 3 exist in the extracted code, the mode B is identified.

In step S1041, when a code which belongs to the feature code group 1 doesn't exist in the extracted code, there is a possibility of mode X. In step S1046, a ratio at which the codes existing in only the modes A and X (codes which belong to the feature code group 2) coincide with the extracted codes is obtained. In step S1047, when the ratio is larger than a predetermined value, the result of identification is set to mode A in step S1048. When it is equal to or smaller than the predetermined value, step S1049 follows and the ratio at which the codes existing in the modes B and X (codes which belong to the feature code group 3) coincide with the extracted codes is obtained. In step S1050, when the ratio is larger than a predetermined value, the result of identification is set to mode B. When it is equal to or smaller than the predetermined value, the result of identification is set to mode X in step S1052. By the above procedure, the modes A, B and X can be identified.

The operation of the identifying process (step S1016) taking the card mode into consideration will now be described.

The identifying process (step S1012) taking all of the modes or the mode of a high use frequency into consideration and the identifying process (step S1014) taking the built-in modes into consideration which have already been described above relate to the method of efficiently identifying the relevant mode from a plurality of modes. However, the identifying process (step S1016) taking the card mode into consideration is a process such that it is sufficient to discriminate whether the received data is data according to the card mode used or not. Therefore, the control code or control code sequence existing in only the card mode used is set to a feature code and the coincidence between the feature code and the extracted code is obtained.

In the identifying process (step S1017) of the card mode, a feature code which is used for identification can be more easily set as compared with the other identifying processes (steps S1012 and S1014). Since the identifying process (step S1017) of the card mode is a process after the other identifying processes (steps S1012 and S1014) were executed, it is sufficient to have a function of an extent such that whether the received data coincides with the card mode or not can be checked. A large number of feature codes for identification are not necessary for such an identifying process. Therefore, there is an advantage such that a dictionary can be easily constructed. Such an advantage is suitable for a situation that is peculiar to the printer such that the kind and use of the card mode depends on the selection of the user.

The card mode is a mode which can be used when the emulation of the necessary mode is stored into an IC card and the card is inserted into the printer. Therefore, in the case where the card is not inserted, the identifying process can be performed on the assumption that this mode is not used. For the identifying process, the reduction in the target for identification has effects such that the identification ratio is improved and the identifying speed is also improved. Therefore, by taking a proper measure in accordance with the presence or absence of the card, the identification can be executed more efficiently.

The control tower 1005 of the printer has an interface to check whether the card has been inserted or not. When the card is not inserted, by reducing the identification target mode from the identifying process of the mode identifier 1004, the efficient identifying process can be realized. That is, as compared with the case where the card has been inserted, the identifying process in the case where no card is inserted has the following advantages.

(1) By omitting the identifying process taking the card mode into consideration, the identifying speed is increased.

(2) In the identifying process (step S1014) taking the built-in modes into consideration which has already been described before, the threshold value upon identification of the modes A and X or the modes B and X decrease and a probability such that the identification is impossible is reduced, thereby improving the identification ratio and the like.

Therefore, there is an effect such that the efficiency of the processes is improved.

According to the embodiment 2 as described above,

1. The sequence logical process in which the inherent control code and control code sequence are set to features is used in the identifying process, so that a high identification ratio and a high identifying speed can be realized.
2. Since the identification of the card mode is executed by the sequence logical process in which the control code and control code sequence existing in the card mode are set to a feature for identification, the dictionary can be easily constructed and can be realized by a simple program and a memory. Therefore, the embodiment 2 is suitable for a situation which is inherent in the card mode having the selection right regarding whether the user uses the card mode or not.
3. By making a structure of the identifying processes such as identifying process taking all of the modes into consideration, identifying process taking the built-in modes into consideration, and identifying process taking the card mode into consideration, it is possible to apply to a situation which is peculiar to the field of the printer such that high identification ratio, high identifying speed, and existence of the card mode.

[Embodiment 3]

According to the conventional identifying method, the mode of the maximum coincidence degree is obtained by the above means and when the maximum coincidence degree is equal to or larger than a predetermined value (threshold value), the mode of the maximum coincidence degree is set to the result of identification. According to this method, when the maximum coincidence degree and the second large coincidence degree have large values, a probability such that an erroneous identification is performed is high. On the other hand, in the case where the maximum coincidence degree doesn't reach a predetermined value because of a lack of amount of the received data or the like, the result such that the identification is impossible is generated. However, in the case where the maximum coincidence degree is fairly larger than the other coincidence degrees, the mode of the maximum coincidence degree can be set to the result of identification. The identification ratio is low according to the conventional method.

Therefore, according to the embodiment 3, in order to compensate the above drawbacks, the problem which occurs due to the simple judgment that is executed by the conventional identifying method is solved by the relative judgment with the other coincidence degrees. In the mode identifying process according to the embodiment 3, the identification degree is obtained by the relative comparison between the maximum coincidence degree and the sum of the other coincidence degrees. In this instance, since it is difficult to express the relation between the sum of the maximum coincidence degree and the other coincidence degrees and the identification degree by a simple numerical expression, it is described by fuzzy rules and the processes are executed by the fuzzy inference.

In the embodiment 3 as well, the present identification processing method is applied to the printer and the functional construction of the printer is similar to that of FIG. 13 of the embodiment 2. Therefore, its description is omitted here.

Figures 18, 20:
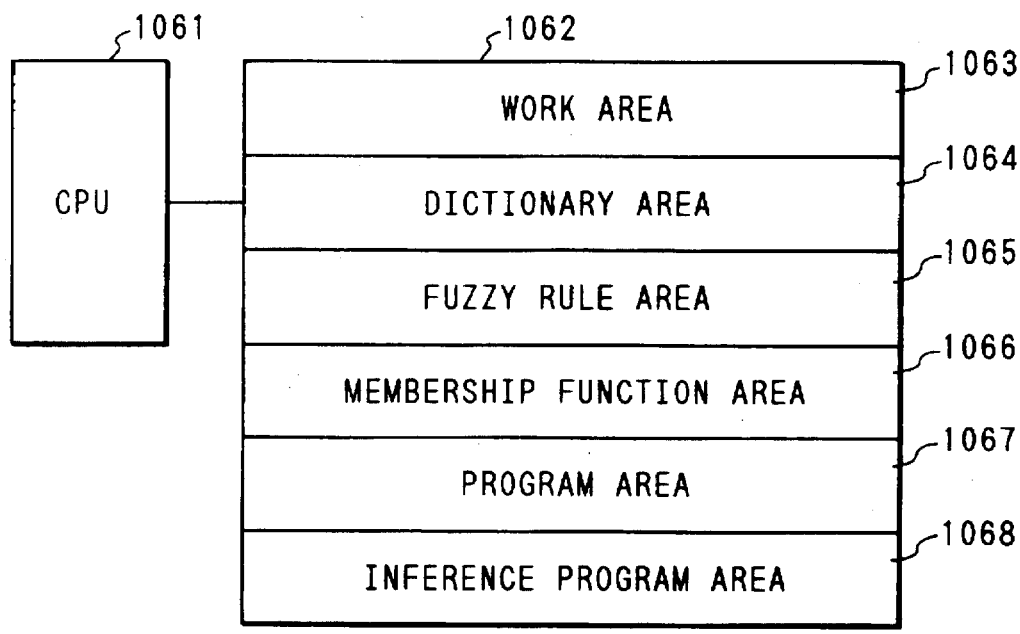
FIG. 18 is a block diagram showing a construction of a mode identifier according to an embodiment 3.
FIG. 20 is a diagram showing a rule matrix which shows the relations among the coincidence degree of mode 1, the sum of the coincidence degrees of the other modes, and the identification degree as a mode 1.

FIG. 18 is a block diagram showing a construction of the mode identifier 1004 in the embodiment 3. Reference numeral 1061 denotes a CPU and 1062 indicates a memory. The memory 1062 has the following areas: namely, a work area 1063 to execute an arithmetic operating process; a dictionary area 1064 to describe a dictionary to identify each mode; a fuzzy rule area 1065 to store fuzzy rules; a membership function area 1066 to store membership functions of each variable; a program area 1067 to store a program to obtain the coincidence degree in each mode; and an inference program area 1068 to store a program to execute the fuzzy inference.

A mode identifying process of the embodiment 3 according to the above construction will now be described hereinbelow.

Figure 19:
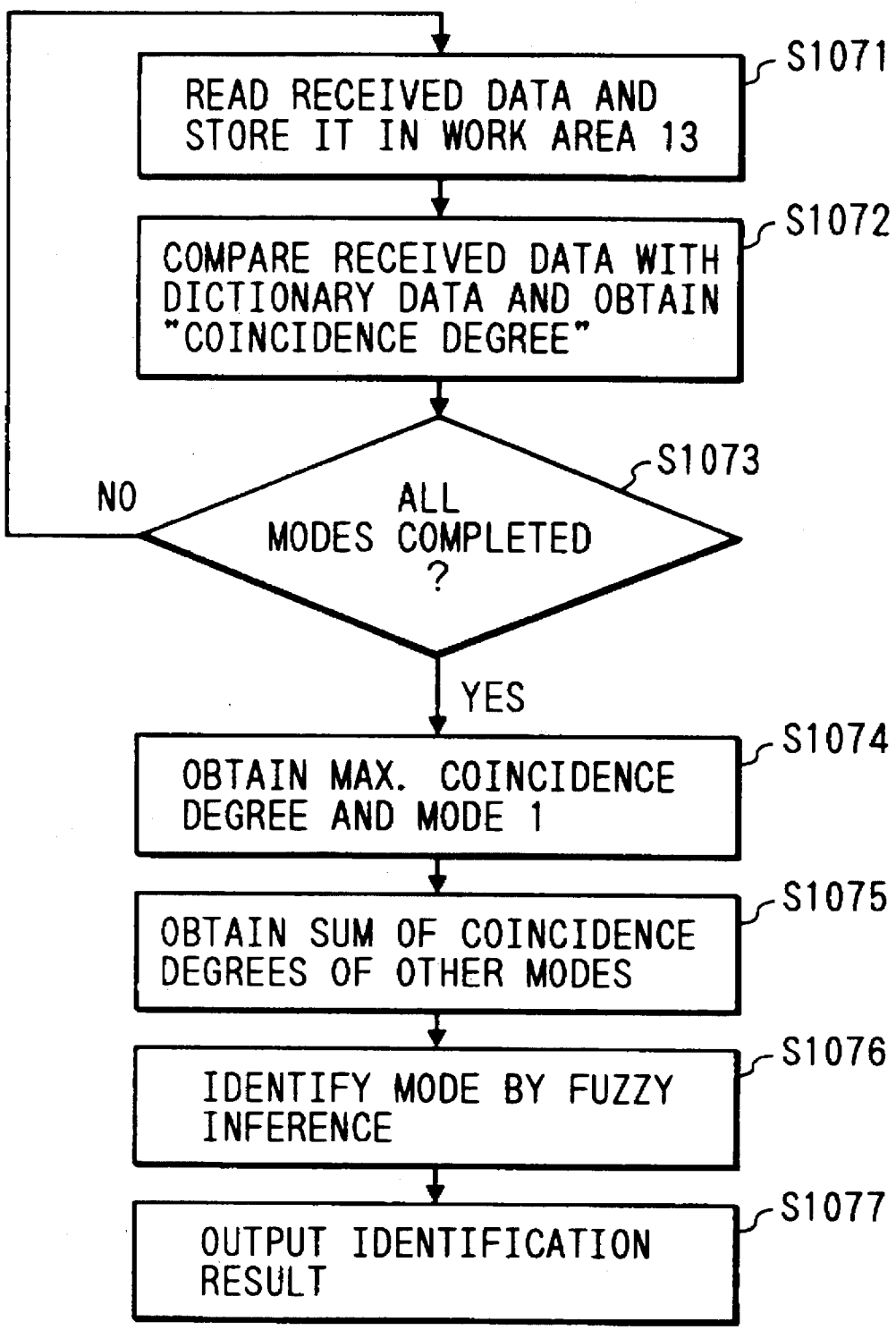
FIG. 19 is a flowchart showing a procedure for an identifying process according to the embodiment 3.

In the mode identifier 1004, in order to execute processes to perform a comparing process for comparing the received data and the dictionary for identification and to identify the mode of the received data, the CPU 1061 executes the programs stored in the program area 1067. FIG. 19 is a flowchart showing a procedure for the identifying process which is executed by the CPU 1061.

In step S1071, the received data stored in the input buffer memory 1003 is read out and stored into the work area 1063. In step S1072, the received data stored in the work area 1063 is read out, the comparison of the control code or control code sequence existing in each mode stored in the dictionary in the dictionary area 1064 and the received data is executed, and the sum (coincidence degree) of the number of coincidence times is obtained. The coincidence degree is stored into the work area 1063. In step S1073, a check is made to see if the comparison with all of the modes has been finished or not. If NO, the processing routine is returned to step S1071 and the above processes are repeated. If YES, step S1074 follows.

In step S1074, the maximum coincidence degree is obtained from the coincidence degrees of the respective modes stored in the memory area for arithmetic operating process and the mode of the maximum coincidence degree (such a mode assumes mode 1) is obtained and they are stored into the work area 1063. In step S1075, on the basis of the coincidence degrees of the modes which have been stored in the work area 1063, the sum of the coincidence degrees of all of the modes other than mode 1 is obtained and stored into the work area 1063. In step S1076, the fuzzy inference is executed by the data of the coincidence degrees obtained in steps S1074 and S1075, thereby executing the identifying process of the mode. The result of identification is outputted in step S1077.

FIG. 20 is a diagram showing a rule matrix showing the relation between the sum of the coincidence degree of mode 1 and the coincidence degrees of the other modes and the identification degree of mode 1. The rule matrix has been stored in the fuzzy rule area 1065. In the rule matrix, the sum of the coincidence degree of mode 1 and the coincidence degrees of the other modes indicates a condition variable. The identification degree of mode 1 indicates a conclusion variable.

if $M_1$ is Z and $M_s$ is Z then H is Z.

For example, as an example of fuzzy rules, there is the following rule:

This rule denotes the relation "if the coincidence degree ($M_1$) of mode 1 is equal to the reference value (Z) and the sum (Ms) of the coincidence degrees of the other modes is equal to the reference value (Z), the identification degree (H) of mode 1 is set to the reference value (Z)".

if $M_1$ is N and $M_s$ is Z then H is NS.

As another example of the fuzzy rule, there is the following rule:

This rule denotes the relation "if the coincidence degree ($M_1$) of mode 1 is lower (N) than the reference value and the sum ($M_s$) of the coincidence degrees of the other modes is equal to the reference value (Z), the identification degree (H) of mode 1 is set to be slightly lower (NS) than the reference value".

The above relations are qualitative. There is a fuzzy theory as means for using such qualitative relations in the control or the like. In the embodiment 3, such a fuzzy theory is applied and its processing procedure will now be described hereinbelow.

Figure 21A:
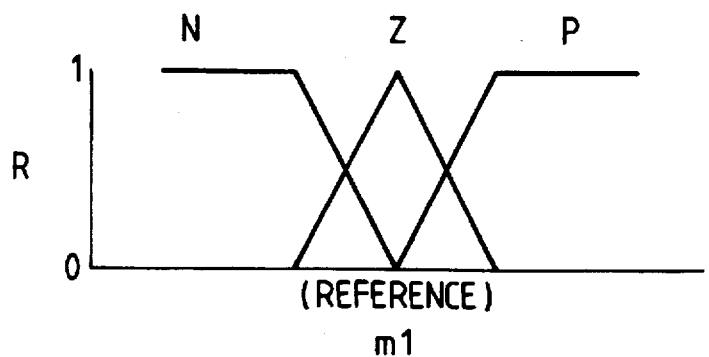
FIG. 21A to FIG. 21C are diagram showing membership functions which are used in the fuzzy inference.
Figure 21B:
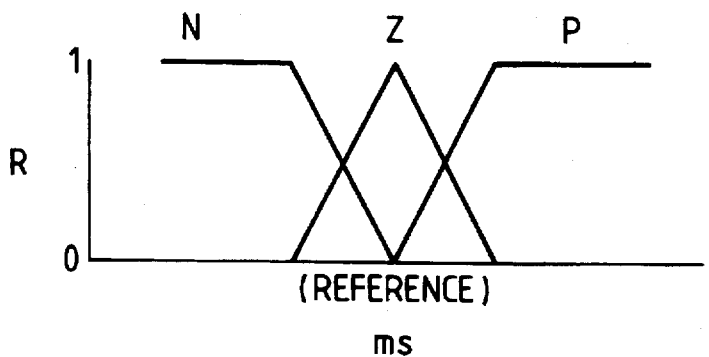
Figure 21C:
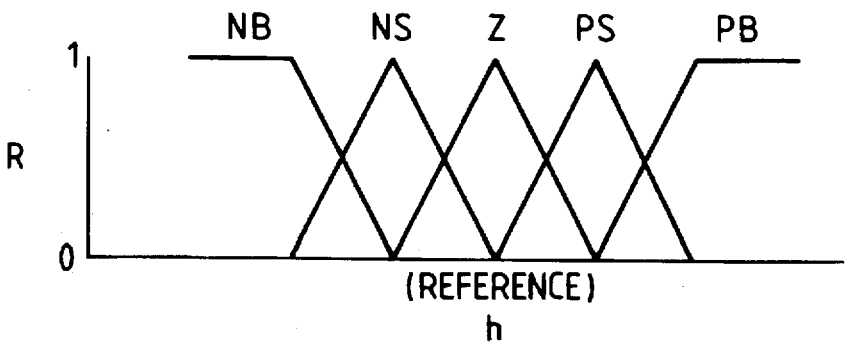
Figure 22:
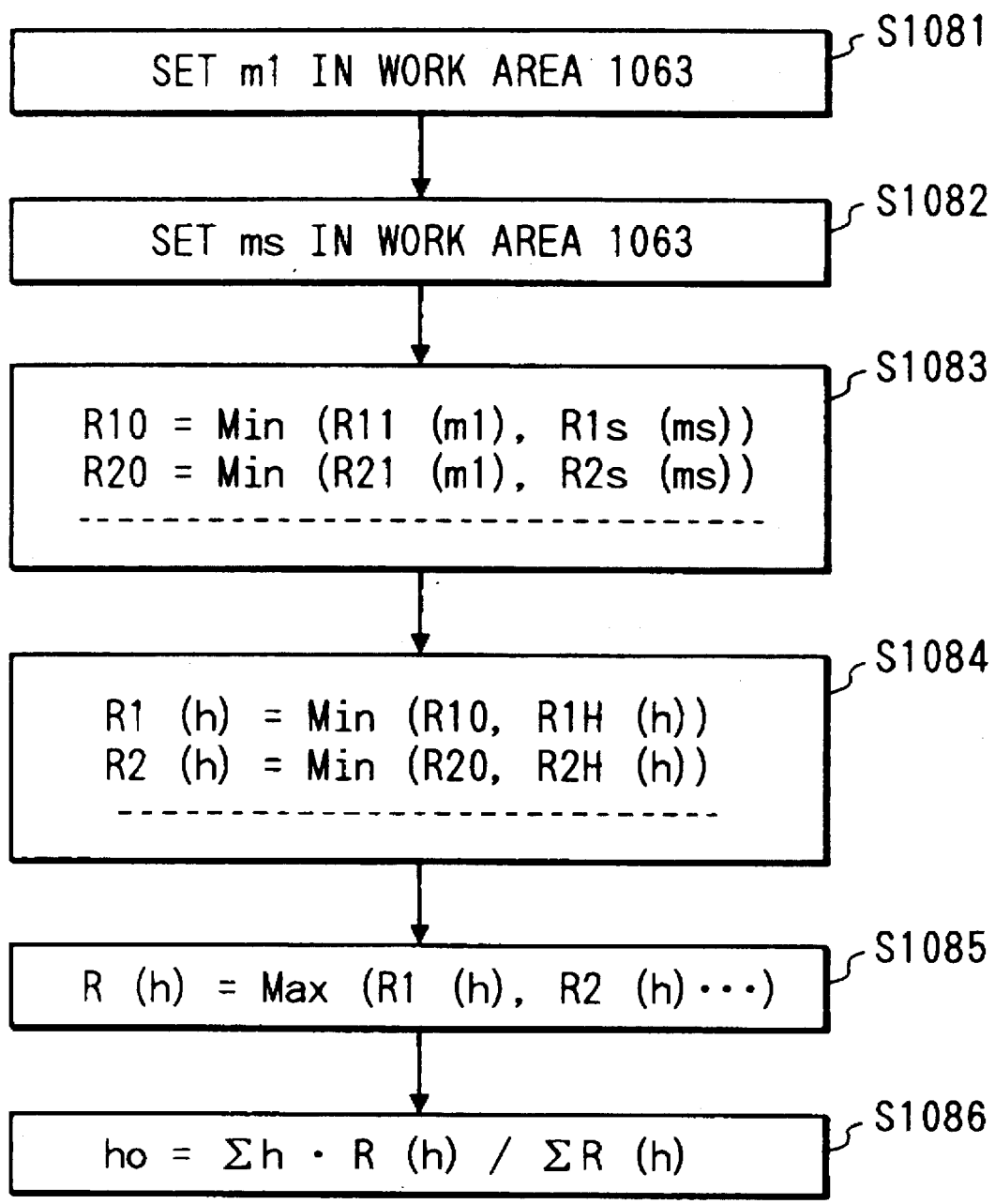
FIG. 22 is a flowchart showing processes of the fuzzy inference.

FIGS. 21A–C are diagrams showing each membership function. FIG. 21A denotes a membership function of the coincidence degree of mode 1; FIG. 21B a membership function of the sum of the coincidence degrees of the other modes; and FIG. 21C membership function of the identification degree of mode 1. Those functions have been stored in the membership function area 1066. The fuzzy inference is executed by using the membership functions. The fuzzy inference will now be described with reference to FIGS. 22 and 23. FIG. 22 is a flowchart showing processes of the fuzzy inference. FIG. 23 includes FIGS. 23A1, 23A2, 23B1, 23B2, 23C1, 23C2, and 23D which are diagrams explaining a procedure to obtain the identification degree on the basis of the membership functions and the coincidence degrees.

In step S1081, the coincidence degree $m_1$ of mode 1 is set into the work area 1063. In step S1082, the sum $m_s$ of the coincidence degrees of the other modes is set into the work memory area 1063. In step S1083, the comparison degrees of the antecedent part of each fuzzy rule and the data $m_1$ and $m_s$ are obtained. As shown by reference numerals 3031 and 3034 in FIGS. 23A1 and 23B1, the comparison degree of the antecedent part is obtained from the membership functions of the coincidence degree of the antecedent part and the sum of the coincidence degrees of the other modes. In order to obtain the comparison degree of both of the coincidence degree of mode 1 and the sum of the coincidence degrees of the other modes, Min of the individual comparison degrees of the coincidence degree of mode 1 and the sum of the coincidence degrees of the other modes is obtained. Explanation will now be made with reference to FIG. 23. The comparison degree with Z in the case where the coincidence degree of mode 1 is equal to $m_1$ is equal to $R_1$. The comparison degree with Z in the case where the sum of the coincidence degrees of the other modes is equal to $m_s$ is equal to $R_{1s}$. In this case, since the value of $R_{11}$ is smaller than $R_{1s}$, $R_{10}=R_{11}$. Similarly, the comparison degree with N when the coincidence degree of mode 1 is equal to $m_1$ is equal to $R_{21}$. The comparison degree with Z when the sum of the coincidence degrees of the other modes is equal to $m_s$ is equal to $R_{2s}$. Since $R_{2s}$ is smaller than $R_{21}$, $R_{20}=R_{2s}$.

In step S1084, the result is obtained from the consequent part of each fuzzy rule. As shown by reference numerals 3035 and 3036 in FIGS. 23C1 and 23C2 result of each fuzzy rule is obtained from the result in step S1083 and the membership functions of the identification degree of mode 1 by using the implication rule. In this case, the result in step S1083 and Min of the membership functions of the identification degree of mode 1 are calculated. The above processes will now be explained with reference to FIG. 23. Now, assuming that the coincidence degree of mode 1 is equal to Z and the sum of the coincidence degrees of the other modes is equal to Z, the identification degree of mode 1 is equal to Z from the fuzzy rules in FIG. 20. Therefore, Z of the membership function of the identification degree of mode 1 is used. The following equation shown in step S1084

$R_1(h) = \min(R_{10}, R_{1H}(h))$ shows a trapezoidal portion in which the comparison degree is equal to or lower than $R_{11}$ in Z in the portion 3035 in FIG. 23C (H denotes a comparison degree of the membership function of the identification degree of mode 1, whereas h indicates an identification degree of mode 1.).

In step S1085, the results of the fuzzy rules in step S1084 are synthesized. For example, by synthesizing by using the Max values of the results in step S1084, function as shown by reference numeral 3037 in FIG. 23D is obtained. In step S1086, the fuzzy amount is converted into the crisp amount. In this case, as shown by $h_0$ in 3037 in FIG. 23D, the crisp result is obtained by using the method of elastic center as shown in step S1086 from the fuzzy result obtained in step S1085. The value of $h_0$ is set to an identification degree of mode 1 and the mode identification is executed.

In the processes shown in FIG. 22, the identification degree of mode 1 is previously obtained for the coincidence degree of an arbitrary mode 1 and the sum of the coincidence degrees of the other modes and is stored in the memory as a table form. Due to this, the result is obtained by merely reading out from the memory in accordance with the coincidence degree derived at the stage of the identifying process, so that the calculating process can be omitted.

Although the embodiment 3 has been described with respect to the case of identifying the mode from the maximum coincidence degree and the sum of the coincidence degrees of the other modes, the invention is not limited to such an example. For instance, the following methods can be considered.

1. The mode is identified from the maximum coincidence degree and (the maximum coincidence degree/the sum of the coincidence degrees of the other modes).

2. The mode is identified from the maximum coincidence degree and the second large coincidence degree.

Those methods can be realized in a manner similar to the foregoing embodiments by describing the qualitative relation between the variable of the antecedent part and the variable of the consequent part by the fuzzy rule for each case.

According to the embodiment as described above, the following advantages are obtained.

1. The result of identification is judged from the relative judgment among the coincidence degrees of a plurality of modes instead of judging the result of identification by the maximum coincidence degree, so that a possibility such that an erroneous identification is performed is reduced.

2. The result of identification is judged from the relative comparison among the coincidence degrees of a plurality of modes, so that the identification ratio is improved and the mode can be identified even from a small amount of data.

3. In the conventional method, the processes are complicated because when the comparing process is performed, it is necessary to accurately execute the feature extracting process (for instance, process to extract the control code or control code sequence from the received data). However, by using the fuzzy inference which permits vagueness, a similar identification ratio can be obtained by simple processes.

Although each of the above embodiments has been described with respect to the case where the present invention is applied to the communication/control between the host computer and the apparatus such as a printer, the invention is not limited to such a case. For instance, as in a document processing apparatus, the invention can be also applied to identifying means or the like when the operator inputs code data into the apparatus and the apparatus identifies the code data and executes a Katakana/Kanji (Chinese character) conversion.

The present invention can be applied to a system comprising a plurality of apparatuses or can be also applied to an apparatus comprising one apparatus. Or, the present invention can be also obviously applied to the case where the invention is realized by supplying a program to such a system or apparatus.

What is claimed is:

1. An apparatus having a plurality of programs for interpreting input code data and generating image information from the interpreted code data, said apparatus comprising:
   determining means for determining whether a first value is equal to or greater than a prescribed threshold, the first value being obtained by dividing a second value indicating the number of first codes, in the input code data, inherent in a first program by a third value for normalizing the second value; and
   identifying means for identifying the first program as a program for interpreting the input code data in response to a determination by said determining means that the first value is equal to or greater than the prescribed threshold.

2. An apparatus according to claim 1, wherein the third value is obtained from the product of an appearance frequency probability of the first code in the input code data and the number of code data used for the identification.

3. An apparatus having a plurality of programs for interpreting input code data and generating image information from the interpreted code data, said apparatus comprising:
   determining means for determining whether a first value is equal to or greater than a prescribed threshold, the first value being obtained by multiplying a second value by a third value, the second value being obtained by dividing a fourth value indicating the number of first codes, in the input code data, inherent in a small number of programs including a first program by a fifth value for normalizing the fourth value, the third value being obtained by dividing a sixth value indicating the number of second codes, in the input code data, inherent in a small number of programs including the first program by a seventh value for normalizing the sixth value; and
   identifying means for identifying the first program as a program for interpreting the input code data in response to a determination by said determining means that the first value is equal to or greater than the prescribed threshold.

4. An apparatus according to claim 3, wherein the fifth value is obtained from the product of an appearance frequency probability of the first code in the input code data and the number of code data used for the identification.

5. An apparatus according to claim 3, wherein the seventh value is obtained from the product of an appearance frequency probability of the second code in the input code data and the number of code data used for the identification.

6. A method carried out in an apparatus having a plurality of programs for interpreting input code data and generating image information from the interpreted code data, said method comprising the steps of:
   determining whether a first value is equal to or greater than a prescribed threshold, the first value being obtained by dividing a second value indicating the number of first codes, in the input code data, inherent in a first program by a third value for normalizing the second value; and
   identifying the first program as a program for interpreting the input code data in response to a determination in said determining step that the first value is equal to or greater than the prescribed threshold.

7. A method according to claim 6, wherein the third value is obtained from the product of an appearance frequency probability of the first code in the input code data and the number of code data used for the identification.

8. A method carried out in an apparatus having a plurality of programs for interpreting input code data and generating image information from the interpreted code data, said method comprising the steps of:
   determining whether a first value is equal to or greater than a prescribed threshold, the first value being obtained by multiplying a second value by a third value, the second value being obtained by dividing a fourth value indicating the number of first codes, in the input code data, inherent in a small number of programs including a first program by a fifth value for normalizing the fourth value, the third value being obtained by dividing a sixth value indicating the number of second codes, in the input code data, inherent in a small number of programs including the first program by a seventh value for normalizing the sixth value; and
   identifying the first program as a program for interpreting the input code data in response to a determination in said determining step that the first value is equal to or greater than the prescribed threshold.

9. A method according to claim 8, further comprising obtaining the fifth value from the product of an appearance frequency probability of the first code in the input code data and the number of code data used for the identification.

10. A method according to claim 8, further comprising obtaining the seventh value from the product of an appearance frequency probability of the second code in the input code data and the number of code data used for the identification.

11. A storage medium for storing a program executed in an apparatus having a plurality of programs for interpreting input code data and generating image information from the interpreted code data, with the program comprising the steps of:
   determining whether a first value is equal to or greater than a prescribed threshold, the first value being obtained by dividing a second value indicating the number of first codes, in the input code data, inherent in a first program by a third value for normalizing the second value; and
   identifying the first program as a program for interpreting the input code data in response to a determination in said determining step that the first value is equal to or greater than the prescribed threshold.

12. A storage medium according to claim 11, wherein the third value is obtained from the product of an appearance frequency probability of the first code in the input code data and the number of code data used for the identification.

13. A storage medium for storing a program executed in an apparatus having a plurality of programs for interpreting input code data and generating image information from the interpreted code data, with the program comprising the steps of:

determining whether a first value is equal to or greater than a prescribed threshold, the first value being obtained by multiplying a second value by a third value, the second value being obtainedby dividing a fourth value indicating the number of first codes, in the input code data, inherent in a small number of programs including a first program by a fifth value for normalizing the fourth value, the third value being obtained by dividing a sixth value indicating the number of second codes, in the input coded data, inherent in a small number of programs including the first program by a seventh value for normalizing the sixth value; and identifying the first program as a program for interpreting the input code data in response to a determination in said determining step that the first value is equal to or greater than the prescribed threshold.

14. A storage medium according to claim 13, wherein the fifth value is obtained from the product of an appearance frequency probability of the first code in the input code data and the number of code data used for the identification.

15. A storage medium according to claim 13, wherein the seventh value is obtained from the product of an appearance frequency probability of the second code in the input code data and the number of code data used for the identification.

* * * * *

UNITED STATES PATENT AND TRADEMARK OFFICE
CERTIFICATE OF CORRECTION

PATENT NO. : 5,675,714
DATED : October 7, 1997
INVENTOR(S) : Kato

Page 1 of 3

It is certified that error appears in the above-identified patent and that said Letters Patent is hereby corrected as shown below: TITLE PAGE:

[56] References Cited:

U.S. PATENT DOCUMENTS

"Fant Tree Based Diagnostics Using Fuzzy Logic P. Gmytrasiewicz et al IEEE/Nov. 11, 1990." should read --Fault Tree Based Diagnostics Using Fuzzy Logic, P. Gmytrasiewicz et al., IEEE/Nov. 11, 1990.--; and "A Multiplier Chip with Multiple-Value Bidirectional Current Mode Logic Circuits M. Kameyama et al. IEEE/Apr. 30, 1998." should read --A Multiplier Chip with Multiple-Value Bidirectional Current Mode Logic Circuits, M. Kameyama et al., IEEE/Apr. 30, 1998.--

COLUMN 3:

Line 58, "or" should read --for--.

COLUMN 9:

Line 67, "process using each" should be deleted.

COLUMN 12:

Line 17, "FIGS" should read --FIG. 11.--; and
Line 18, "11A1 and 11B1. In FIG. 11," should read --In FIGS. 11A1 and 11B1,--.

UNITED STATES PATENT AND TRADEMARK OFFICE
CERTIFICATE OF CORRECTION

PATENT NO. : 5,675,714
DATED : October 7, 1997
INVENTOR(S) : Kato

It is certified that error appears in the above-identified patent and that said Letters Patent is hereby corrected as shown below:

COLUMN 13:

Line 8, "FIG. 110" should read --FIG. 11D--; and
    Line 65, "them ode" should read --the mode--.

COLUMN 14:

Line 28, "them ode" should read --the mode--; and
    Line 59, "Them ode" should read --The mode--.

COLUMN 15:

Line 16, "them odes" should read --the modes--.

COLUMN 16:

Line 59, "one" should be deleted;
    Line 60, "of the feature code group $B_c$ or not.
      If YES," should be deleted; and
    Line 62, "either step S1025 follows." should read
      --either one of the feature code group $B_c$ or not.
      If YES, step S1025 follows.--

UNITED STATES PATENT AND TRADEMARK OFFICE
CERTIFICATE OF CORRECTION

PATENT NO. : 5,675,714
DATED : October 7, 1997
INVENTOR(S) : Kato

It is certified that error appears in the above-identified patent and that said Letters Patent is hereby corrected as shown below:

COLUMN 20:

Line 26, "3accord-" should read -- 3 accord- --.

COLUMN 21:

Line 5, "if $M_1$ is Z and $M_s$ is Z then H is Z." should read
--For example, as an example of fuzzy rules, there is the following rule:
if $M_1$ is Z and $M_s$ is Z then H is Z.--;
Lines 6 and 7 should be deleted;
Line 12, "if $M_1$ is N and $M_s$ is Z then H is NS." should read
--As another example of the fuzzy rule, there is the following rule:
if $M_1$ is N and $M_s$ is Z then H is NS.--; and
Lines 13 and 14 should be deleted.

Signed and Sealed this

Seventh Day of July, 1998

*Attest:*

BRUCE LEHMAN

*Attesting Officer*     *Commissioner of Patents and Trademarks*